(12) United States Patent
Fujimoto et al.

(10) Patent No.: US 6,950,613 B2
(45) Date of Patent: Sep. 27, 2005

(54) OFFICE INFORMATION SYSTEM HAVING A DEVICE WHICH PROVIDES AN OPERATIONAL MESSAGE OF THE SYSTEM WHEN A SPECIFIC EVENT OCCURS

(75) Inventors: Jun-Ichiroh Fujimoto, Kanagawa (JP); Takashi Ariyoshi, Kanagawa (JP); Yoshinaga Kato, Kanagawa (JP); Hiroo Kitagawa, Kanagawa (JP); Yuichi Kojima, Kanagawa (JP); Lu Bin, Tokyo (JP); Tetsuya Muroi, Kanagawa (JP); Tetsuya Sakayori, Kanagawa (JP); Yoshifumi Sakuramata, Kanagawa (JP); Junichi Takami, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 194 days.

(21) Appl. No.: 10/625,538

(22) Filed: Jul. 24, 2003

(65) Prior Publication Data

US 2005/0078967 A1 Apr. 14, 2005

Related U.S. Application Data

(62) Division of application No. 09/477,727, filed on Jan. 5, 2000, now Pat. No. 6,701,095.

(30) Foreign Application Priority Data

| Jan. 8, 1999 | (JP) | ............................................ | 11-002988 |
| Jan. 20, 1999 | (JP) | ............................................ | 11-011374 |
| Jan. 25, 1999 | (JP) | ............................................ | 11-015446 |
| Jan. 26, 1999 | (JP) | ............................................ | 11-016836 |
| Jan. 26, 1999 | (JP) | ............................................ | 11-017003 |
| Jan. 28, 1999 | (JP) | ............................................ | 11-019557 |
| Feb. 9, 1999 | (JP) | ............................................ | 11-030931 |
| Mar. 11, 1999 | (JP) | ............................................ | 11-065466 |

(51) Int. Cl.$^7$ .............................................. G03G 15/00
(52) U.S. Cl. ............................... 399/8; 395/114; 399/9; 399/15; 358/1.15
(58) Field of Search ............................ 399/8, 9, 15, 24, 399/49; 358/1.15; 395/114

(56) References Cited

U.S. PATENT DOCUMENTS

| 4,500,971 A | 2/1985 | Futaki et al. |
| 4,206,996 A | 6/1990 | Clark et al. |
| 4,975,783 A | 12/1990 | Takaoka |

(Continued)

FOREIGN PATENT DOCUMENTS

| JP | 3-187567 | 8/1991 |
| JP | 04-148754 | 5/1992 |
| JP | 05-050719 | 3/1993 |

(Continued)

*Primary Examiner*—Hoan Tran
(74) *Attorney, Agent, or Firm*—Dickstein Shapiro Morin & Oshinsky LLP

(57) ABSTRACT

An office information system having a device which provides a user with an operational message of the system is disclosed. In an embodiment of the office information system, a path record storage device stores a plurality of path records related to components of the system, each path record indicating a locating path needed to reach a location of a specific one of the components in the system when a failure related to the specific one of the components occurs. A failure location detecting device detects a location of a component in the system when a failure related to the component occurs. A reached location determining device reads a path record from the path record storage device when the location of the failure is detected, and determines a currently reached location in the system based on the path indicated by the path record. A message device generates, when the reached location is determined, an operational message needed for recovering the failure at a subsequent location in the path following the reached location.

14 Claims, 30 Drawing Sheets

U.S. PATENT DOCUMENTS

| | | | |
|---|---|---|---|
| 5,089,848 A | 2/1992 | Kusuda et al. | |
| 5,377,017 A | 12/1994 | Lam | |
| 5,467,169 A | 11/1995 | Morikawa | |
| 5,694,528 A | * 12/1997 | Hube | 358/1.14 |
| 5,933,677 A | 8/1999 | Lee | |
| 6,216,113 B1 | 4/2001 | Aikens et al. | |
| 6,487,375 B2 | * 11/2002 | Ferrer et al. | 399/8 |

FOREIGN PATENT DOCUMENTS

| | | |
|---|---|---|
| JP | 05-268335 | 10/1993 |
| JP | 5-276259 | 10/1993 |
| JP | 6-54105 | 2/1994 |
| JP | 06230627 | 8/1994 |
| JP | 07-186496 | 7/1995 |
| JP | 8-297439 | 11/1996 |
| JP | 09050316 | 2/1997 |
| JP | 09-188032 | 7/1997 |
| JP | 10-19662 | 1/1998 |
| JP | 10-190844 | 7/1998 |
| KR | 1998-021385 A | 6/1998 |

* cited by examiner

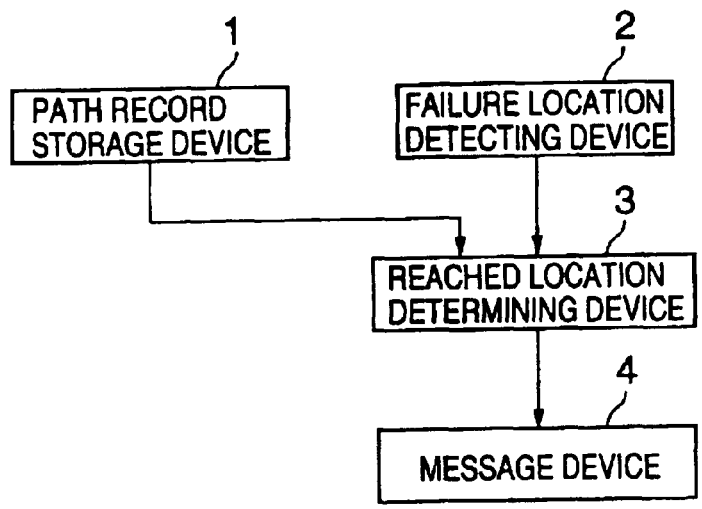

FIG. 19

| TRANSMIT DATA ID | TRANSMIT DATE/TIME | DESTINATION PHONE NO. | TRANSMIT TERMINAL | MESSAGE RECEIVING TERMINAL | DESTINATION DEVICE ADDRESS | NAME OF REQUESTING PERSON |
|---|---|---|---|---|---|---|
| 1 | DATE/TIME #1 | PHONE #1 | T2(FAX) | T3(E-MAIL) | name@ricoh.co.jp | NAME #1 |
| 2 | DATE/TIME #2 | PHONE #2 | T3(E-MAIL) | T1(FAX) | 3(DEVICE NO.) | NAME #2 |
| 3 | DATE/TIME #3 | PHONE #3 | T1(FAX) | T5(TEL) | 123-4567(PHONE NO.) | NAME #3 |
| 4 | DATE/TIME #4 | PHONE #4 | Tn(FAX) | T6(PRT) | 1(DEVICE NO.) | NAME #4 |

| MACHINE NOISE DATA | DATE AND TIME | RESULT OF EVALUATION |
|---|---|---|
| ×××× | 1/6  10:30 | ACCEPT |
| ××××× | 1/7  15:15 | REJECT |
| ××× | 1/9  17:40 | ACCEPT |
| ×××××× | 1/10  9:54 | |
| | | |

| MACHINE NOISE DATA | DATE AND TIME | RESULT OF EVALUATION | LABEL |
|---|---|---|---|
| ×××× | 1/6  10:30 | ACCEPT | |
| ××××× | 1/7  15:15 | REJECT | FAILURE |
| ××× | 1/9  17:40 | ACCEPT | |
| ×××××× | 1/10  9:54 | | OTHER NOISE |
| | | | |

| VOICE INPUT | STORED INCREMENT |
|---|---|
| THICKER | "2" |
| SLIGHTLY THICKER | "1" |
| TOO THIN | "2" |
| | |

OFFICE INFORMATION SYSTEM HAVING A DEVICE WHICH PROVIDES AN OPERATIONAL MESSAGE OF THE SYSTEM WHEN A SPECIFIC EVENT OCCURS

This application is a divisional of application Ser. No. 09/477,727, filed Jan. 5, 2000, now U.S. Pat. No. 6,701,095 which is hereby incorporated by reference.

BACKGROUND OF THE INVENTION (1) Field of the Invention

The present invention generally relates to office information systems, such as copiers, facsimiles or printers, and more particular to an office information system having a device which provides a user (or a request source) with an operational message of the office information system when an specific event occurs.

(2) Description of the Related Art

FIG. 8 shows an enclosure of an office information system according to the related art. This office information system is, for example, a copier, a facsimile or a printer.

In the office information system of FIG. 8, a liquid-crystal-display (LCD) panel 101 is provided on top of an enclosure 100, and an access door 102 is provided at a lower portion of the enclosure 100. The access door 102 is opened by the operator or user who wishes to look into the internal components of the system for the purpose of repair or maintenance.

When a failure, such as paper jam or lack of toner, in the office information system of the above type takes place, an image indicating a failure location in the system is displayed on the LCD panel 101.

FIG. 9 shows an image of a failure location displayed on the LCD panel 100 of the office information system of FIG. 8. In the example of FIG. 9, a paper jam occurs in the system and a location "B3" of the paper jam in the system is indicated in the displayed image.

FIG. 10 shows an internal structure of the office information system of FIG. 8 when the access door 102 is opened and the internal components of the system are looked into. As shown in FIG. 10, the office information system includes, for example, a plurality of components at respective locations A1, A2, B1, B2 and B3.

The user views the image on the LCD panel 100, opens the access door 102, and searches for the location of the paper jam in the actual system corresponding to the location "B3" in the displayed image. If the location of the paper jam can be found, the user performs a repairing or correcting operation on the related component at the location "B3" so as to eliminate the failure from the system.

However, in the office information system of FIG. 8, a guidance message which helps the user to recover the paper jam or lack of toner in the system is only the image displayed on the LCD panel 101. Such a message is often inadequate for the user to complete failure-recovery operations on the system, and this makes it difficult to efficiently carry out the failure recovery.

For example, when the location "B3" of the failure indicated by the displayed image is a concealed place within the system, finding the actual component related to the failure in the system is difficult, or a considerable time and cost is needed to find it. When a certain preliminary operation must be formed to reach the related component at the location "B3" of the failure, the user is often unable to recognize the need of the preliminary operation from the displayed image only. Therefore, it is desirable that an office information system which ensures easy searching and recognition of a location of a failure in the system and provides the user with a failure-recovery operational message for efficient failure recovery is provided.

SUMMARY OF THE INVENTION

An object of the present invention is to provide an improved office information system in which the above-described problems are eliminated.

Another object of the present invention is to provide an office information system which ensures easy searching and recognition of a location of a failure in the system and provides a user with a failure-recovery operational message that allows efficient failure recovery in the system.

Another object of the present invention is to provide an office information system which allows the setting of customized operational messages of the system appropriate for individual users and increases the operability of the system for the individual users by the use of the customized operational messages.

Another object of the present invention is to provide an office information system having a communication device linked to a remote terminal via a network for telecommunications between the system and the remote terminal, which safely returns, when an image from the remote terminal is received at the system but an error occurs in the outputting of a reconstructed image by the system, an error message back to the remote terminal.

Another object of the present invention is to provide an office information system having a communication device linked to a remote terminal via a network for telecommunications between the system and the remote terminal, which safely returns, when a specific request from the remote terminal is accepted at the system, an operational message related to image quality or sheet quality, back to the remote terminal.

Another object of the present invention is to provide an office information system which ensures easy searching and recognition of a failure in the system by using a result of a machine noise evaluation, and provides a user with an operational message that allows efficient failure recovery in the system.

Another object of the present invention is to provide an office information system which ensures easy recognition of lack of toner or lack of copy sheets in the system by providing a user with a failure-detection voice message based on a result of a self-diagnosis of the system.

Another object of the present invention is to provide an office information system which provides a user with an increased operability in the setting of operating conditions and operating condition changes to an image forming operation being executed on the office information system, and allows easy operating-condition setting procedures for the user.

Another object of the present invention is to provide an office information system which ensures improved man-machine interface which allows a user to easily recognize an operational error in the system.

The above-mentioned objects of the present invention are achieved by an office information system including: a path record storage device which stores a plurality of path records related to components of the system, each path record indicating a locating path needed to reach a location of a specific one of the components in the system when a failure of the specific one of the components occurs; a failure location detecting device which detects a location of a component in the system when a failure related to the component occurs; a reached location determining device which reads a path record from the path record storage device when the location of the failure is detected, and determines a currently reached location in the system based on the path indicated by the path record; and a message device which generates, when the reached location is determined, an operational message needed for recovering the failure at a subsequent location of the path following the reached location.

In the office information system of the present invention, the reached location determining device reads a path record from the path record storage device when the location of the failure is detected, and determines a currently reached location in the system based on the path indicated by the path record, and the message device generates, when the reached location is determined, an operational message needed for recovering the failure at a subsequent location of the path following the reached location. The office information system of the present invention is effective in providing easy searching and recognition of a location of a failure in the system and in providing the user with a failure-recovery operational message that allows efficient failure recovery in the system.

The above-mentioned objects of the present invention are achieved by an office information system including: a user identifying device which authenticates a personal identification by receiving a user ID; a customizing device which generates a customized operational message of the system appropriate for a user whose identification is authenticated; and an operational history storage device which stores operational history records of a number of users, each user having a different user ID, and each history record indicating an operational characteristic of one of the number of users, wherein the customizing device reads an operational history record of the user, whose identification is authenticated, from the operational history storage device, detects the operational characteristic of the user from the read history record, and updates the customized operational message in accordance with the detected operational characteristic.

In the office information system of the present invention, the customizing device reads an operational history record of the user, whose identification is authenticated, from the operational history storage device, detects the operational characteristic of the user from the read history record, and updates the customized operational message in accordance with the detected operational characteristic. The office information system of the present invention is effective in setting the customized operational messages of the system appropriate for individual users and in increasing the operability of the system for the individual users by the use of the customized operational messages.

The above-mentioned objects of the present invention are achieved by an office information system including: a communication device linked to a remote terminal via a network for telecommunications between the system and the remote terminal; an information processing device which produces a reconstructed image when an image transmitted by the remote terminal is received by the communication device via the network; an output-data processing device which determines whether the reconstructed image output from the information processing device is defective in an image quality; and a message device which supplies, when the reconstructed image is determined as being defective, an error message, indicating that an error occurs in the outputting of the image by the system, to the communication device, so that the error message is transmitted to the remote terminal via the network.

In the office information system of the present invention, the output-data processing device determines whether the reconstructed image output from the information processing device is defective in the image quality, and the message device supplies, when the reconstructed image is determined as being defective, an error message, indicating that an error occurs in the outputting of the image by the system, to the communication device, so that the error message is transmitted to the remote terminal via the network. The office information system of the present invention is effective in safely transmitting an error message from the system to the remote terminal when an error occurs in the outputting of the image by the system.

The above-mentioned objects of the present invention are achieved by an office information system including: a communication device linked to a remote terminal via a network for telecommunications between the system and the remote terminal; a printing device which produces a printed image; an image-quality evaluation device which produces a result of evaluation of a quality of the printed image every time the printed image is output by the printing device; and a storage device, coupled to the communication device, which stores the result of evaluation output by the image-quality evaluation device, wherein a latest result of the evaluation that is output by the image-quality evaluation device is stored in the storage device, and the communication device transmits an operational message, indicating the stored latest result of the evaluation, to the remote terminal via the network when an image-quality message request from the remote terminal is received at the communication device.

In the office information system of the present invention, the latest result of the evaluation that is output by the image-quality evaluation device is stored in the storage device, and the communication device transmits an operational message, indicating the stored latest result of the evaluation, to the remote terminal via the network when an image-quality message request from the remote terminal is received at the communication device. The office information system of the present invention makes it possible to provide the user on the remote terminal with the operational message of the system when a specific request from the remote terminal is received.

The above-mentioned objects of the present invention are achieved by an office information system including: a sound input device which accepts an input signal; an acoustic signal detecting device which detects an acoustic signal from the input signal accepted by the sound input device; a first evaluation device which determines whether the detected acoustic signal is a noise signal or a speech signal; a speech dictionary which stores reference feature patterns provided for a speech recognition; a machine noise dictionary which stores reference noise patterns provided for a noise/speech evaluation; a speech recognition device which recognizes, when the detected acoustic signal is determined as being the speech signal, the speech signal as being an operational request based on the reference feature patterns from the speech dictionary; a second evaluation device which determines whether the noise signal is acceptable based on the reference noise patterns from the machine noise dictionary, when the detected acoustic signal is determined as being the noise signal; a noise storage device which stores a machine noise signal; a noise storage control device which allows the machine noise signal to be stored into the noise storage device, based on a result of the determination of the noise signal by the second evaluation device; and a sound output device which reproduces the noise signal from the noise storage device.

In the office information system of the present invention, the second evaluation device determines whether the noise signal is acceptable based on the reference noise patterns from the machine noise dictionary, when the detected acoustic signal is determined as being the noise signal. The noise storage control device allows the machine noise signal to be stored into the noise storage device, based on a result of the determination of the noise signal by the second evaluation device. The sound output device reproduces the noise signal from the noise storage device. The office information system of the present invention is effective in providing easy searching and recognition of a failure in the system by using the result of the machine noise evaluation, and in providing the user with an operational message that allows efficient failure recovery in the system.

The above-mentioned objects of the present invention are achieved by an office information system including: an image processing device which prints a processed image, obtained from an original image, on a copy sheet; a self-diagnosis device which determines whether the printed image on the copy sheet, output from the image processing device, is defective in image quality; and a voice output device which outputs a synthesized voice when the printed image is determined as being defective, the synthesized voice indicating a result of the determination by the self-diagnosis device.

In the office information system of the present invention, the voice output device outputs a synthesized voice when the printed image is determined as being defective, the synthesized voice indicating a result of the determination by the self-diagnosis device. The office information system of the present invention is effective in providing easy recognition of lack of toner or lack of copy sheets in the system by providing a user with a failure-detection voice message based on the result of the self-diagnosis of the system.

The above-mentioned objects of the present invention are achieved by an office information system including: a voice input device which accepts an input voice from a user so as to generate an electrical signal corresponding to the input voice; a voice recognition device which recognizes the electrical signal, produced by the voice input device, as being an operational command input to the office information system; and a command execution device which executes an image forming operation on the office information system based on the operational command recognized by the voice recognition device, wherein the voice recognition device is configured to recognize the electrical signal as being an operational command which sets an operating condition change to the image forming operation, the operating condition change being represented by a difference between a previously-set operating condition and a currently-set operating condition.

In the office information system of the present invention, the voice recognition device is configured to recognize the electrical signal as being an operational command which sets an operating condition change to the image forming operation, the operating condition change being represented by a difference between a previously-set operating condition and a currently-set operating condition. The command execution device executes an image forming operation on the office information system based on the recognized operational command. The office information system of the present invention is effective in providing an increased operability in the setting of the operating conditions and the operating condition changes to the image forming operation being executed on the office information system. It is possible for the office information system of the present invention to ensure easy operating-condition setting procedures for the user.

The above-mentioned objects of the present invention are achieved by an office information system including: an operational event detecting device which determines whether an operational error occurs in the system by detecting a plurality of predetermined operational events in the system; and a voice message device which outputs a voice message based on a result of the detection of the plurality of predetermined operational events, the voice message being indicative of the occurrence of an operational error in the system.

In the office information system of the present invention, the voice message device outputs a voice message based on a result of the detection of the plurality of predetermined operational events, the voice message being indicative of the occurrence of an operational error in the system. The office information system of the present invention is effective in providing improved man-machine interface which allows the user to easily recognize the operational error in the system.

BRIEF DESCRIPTION OF THE DRAWINGS

Other objects, features and advantages of the present invention will become more apparent from the following detailed description when read in conjunction with the accompanying drawings in which:

FIG. 1 is a block diagram of a first embodiment of the office information system according to the invention;

FIG. 2 is a diagram for explaining path records stored in a path record storage device in the office information system of the present embodiment;

FIG. 19 is a diagram for explaining a request-source information stored in the office information system of FIG. 18;

DETAILED DESCRIPTION OF THE PREFERRED EMBODIMENTS

A description will now be given of the preferred embodiments of the present invention with reference to the accompanying drawings.

FIG. 1 is a block diagram of a first embodiment of the office information system according to the invention. The office information system of this embodiment is applicable to copier systems, facsimile systems or printer systems.

The office information system of FIG. 1 includes a path record storage device 1 which stores a plurality of path records related to components of the system, each path record indicating a locating path needed to reach a location of a specific one of the components in the system when a failure of the specific one of the components occurs. A failure location detecting device 2 detects a location of a component in the system when a failure related to that component occurs. A reached location determining device 3 reads a path record from the path record storage device 1 when the location of the failure is detected by the failure location detecting device 2, and determines a currently reached location in the system based on the path indicated by the path record. A message device 4 generates, when the reached location is determined by the reached location determining device 3, an operational message needed for recovering the failure at a subsequent location of the path following the reached location.

Figure 8:
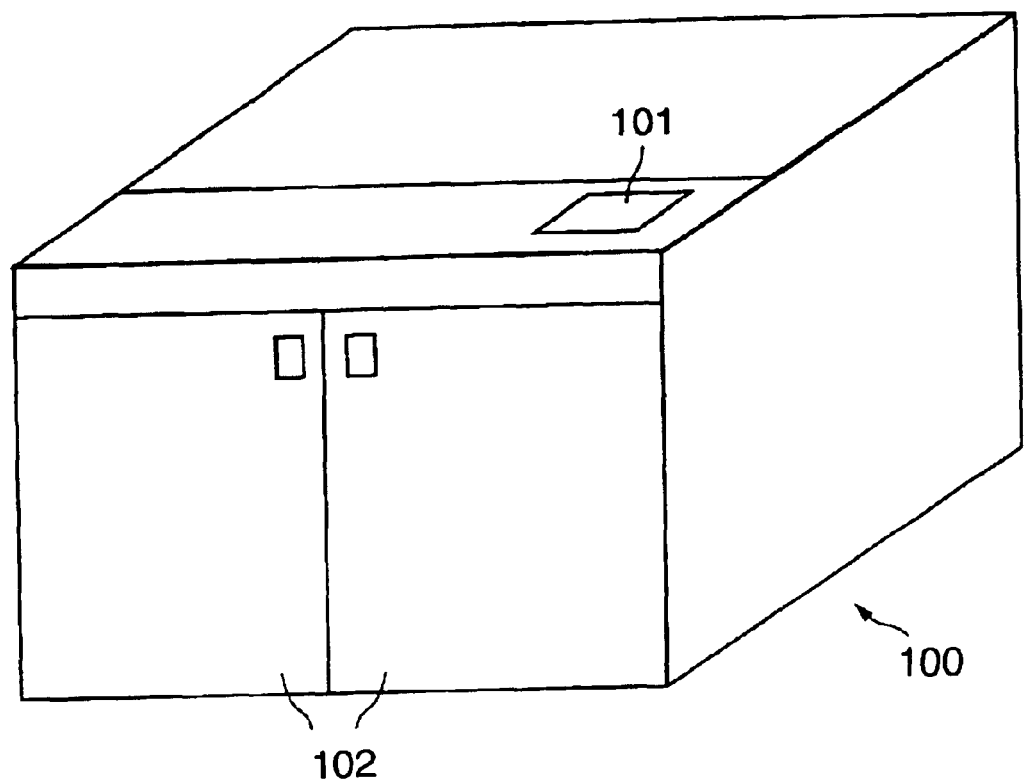
FIG. 8 is a diagram showing an enclosure of an office information system according to the related art.
Figure 10:
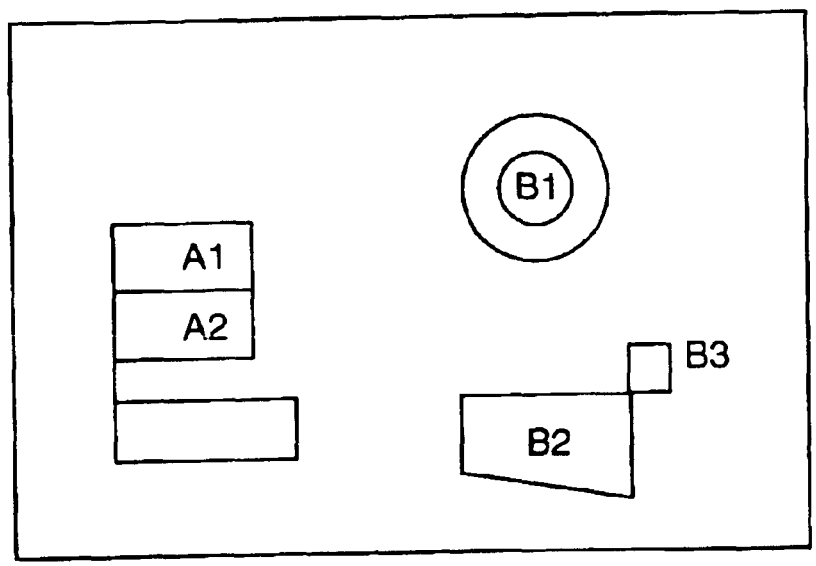
FIG. 10 is a diagram showing an internal structure of the office information system of FIG. 8.

For the sake of simplicity of description, suppose that the office information system of the present embodiment includes an enclosure which is essentially the same as the enclosure 100 shown in FIG. 8. That is, an LCD panel is provided on top of the enclosure of the office information system of the present embodiment, and an access door is provided at a lower portion of the enclosure. Further, the office information system of the present embodiment includes a plurality of internal components at respective locations A1, A2, B1, B2 and B3, as shown in FIG. 10. The operator on the office information system of the present embodiment opens the access door and looks into the components of the system for the purpose of repair or maintenance.

FIG. 2 is a diagram for explaining path records stored in the path record storage device 1 in the office information system of the present embodiment.

As described above, it is supposed that the office information system of the present embodiment includes the internal components at the respective locations A1, A2, B1, B2 and B3, as shown in FIG. 10.

As shown in FIG. 2, each path record stored in the path record storage device 1 indicates a failure location and its locating path. The locating path is needed for the user (or the operator) to reach a location of a specific one of the components in the system when a failure of the specific one of the components occurs. The locating path means a list of the internal components of the system, showing the route that the user has to take to find the location of the detected failure in the system.

For example, when a failure of the component B1 occurs, the path record corresponding to the failure location B1 in the path record storage device 1 indicates the locating path "B1" as shown in FIG. 2. This means that the route the user has to take to find the location of the faulty component B1 is the component B1 only. When a failure of the component B3 occurs, the path record corresponding to the failure location B3 in the path record storage device 1 indicates the locating path "B2, B3" as shown in FIG. 2. This means that the route the user has to take to find the location of the faulty component B3 is the components B2 and B3, and that the user has to remove or move the component B2 from the original position before reaching the location of the faulty component B3.

Figure 3:
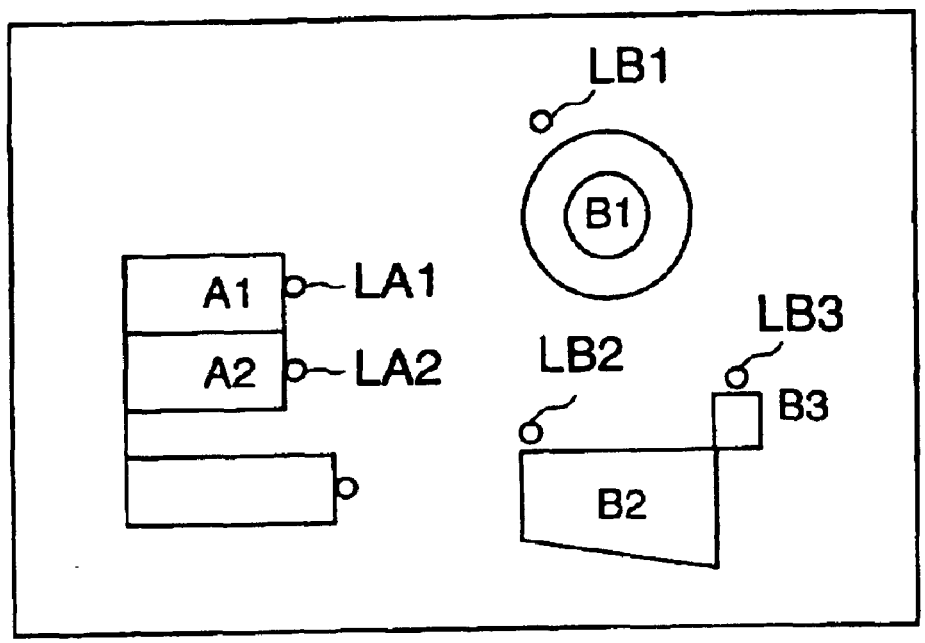
FIG. 3 is a diagram showing an example of a message device in the office information system of the present embodiment.

FIG. 3 shows an example of the message device 4 in the office information system of the present embodiment. As shown in FIG. 3, the message device 4 includes a plurality of optical-output indicators LA1, LA2, LB1, LB2 and LB3, which are provided adjacent to the respective internal components A1, A2, B1, B2 and B3 of the system. The optical-output indicators are, for example, light-emitting diodes (LED). Each of these optical-output indicators lights up (or blinks) in response to a light-on signal that indicates a subsequent location of the locating path following the reached location in the system.

In the office information system of FIG. 3, the message device 4 provides the user with the operational message by outputting a light-on signal that is indicative of a subsequent location of the locating path following the reached location in the system. This light-on signal is output by the message device 4 to a corresponding one of the optical-output indicators LA1, LA2, LB1, LB2 and LB3 of the system. Accordingly, the office information system of the present embodiment is effective in providing easy searching and recognition of a location of a failure in the system and in providing the user with a failure-recovery operational message that allows efficient failure recovery in the system.

Alternatively, the message device 4 may provide the user with the operational message by outputting a synthesized voice signal that is indicative of a subsequent location of the locating path following the reached location in the system. In this case, the message device 4 includes a voice synthesis unit for generating the synthesized voice signal, and a speaker outputting a synthesized voice in response to the voice signal.

A description will now be given of an operation of the office information system of the present embodiment.

Figure 9:
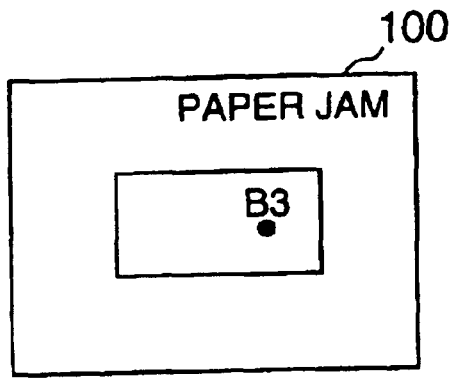
FIG. 9 is a diagram showing an image of a failure location displayed on an LCD panel of the office information system of FIG. 8.

When a failure, such as paper jam or lack of toner, in the office information system of the present embodiment occurs, an image indicating a failure location in the system is displayed on the LCD panel on top of the enclosure of the system in a manner similar to the example of FIG. 9. Suppose that a paper jam has occurred at the location of the component B3 in the system. The user views the image on the LCD panel, opens the access door, and searches for the location of the paper jam in the system corresponding to the location "B3" in the displayed image. If the location of the paper jam can be found, the user performs a repairing or correcting operation on the related component at the location "B3" so as to eliminate the failure from the system.

In the above-mentioned case, the failure location detecting device 2 detects the location of the faulty component B3 in the office information system of FIG. 1 when the paper jam occurs. The reached location determining device 3 reads a corresponding path record (or the locating path "B2, B3") from the path record storage device 1 when the location of the failure is detected by the failure location detecting device 2, and determines a currently reached location in the system based on the path indicated by the path record. The message device 4 generates, when the reached location is determined by the reached location determining device 3, an operational message needed for recovering the failure at a subsequent location of the path following the reached location.

Specifically, in the office information system of FIG. 3, when the path record (or the locating path "B2, B3") is read from the path record storage device 1, the reached location determining device 3 initially determines the location of the access door as being the currently reached location in the system. The message device 4 initially outputs a light-on signal to the optical-output indicator LB2 at the subsequent location B2 in the system. The optical-output indicator LB2 lights up or blinks. If the user removes or moves the component B2 from the original position, the reached location determining device 3 determines the location of the component B2 as being the currently reached location in the system based on the path record. The message device 4 outputs a light-on signal that is indicative of the subsequent location B3 of the locating path following the reached location B2 in the system. The message device 4 outputs the light-on signal to the optical-output indicator LB3. The optical-output indicator LB3 lights up or blinks, which shows the location of the faulty component B3 in the system for the user.

Also, in the case of the message device 4 which outputs a synthesized voice signal in order to provide the user with the operational message, a similar operation is carried out by the office information system of the present embodiment. The message device 4 initially outputs a synthesized voice signal indicating the location of the component B2 in the system. If the user removes or moves the component B2 from the original position, the reached location determining device 3 determines the location of the component B2 as being the currently reached location in the system based on the path record. The message device 4 outputs a synthesized voice signal that is indicative of the subsequent location B3 of the locating path following the reached location B2 in the system, which shows the location of the faulty component B3 in the system for the user. Accordingly, the office information system of the present embodiment is effective in providing easy searching and recognition of a location of a failure in the system and in providing the user with a failure-recovery operational message that allows efficient failure recovery in the system.

Further, in the office information system of the present embodiment, the message device 4 may be configured to provide the user with the operational message by outputting both the light-on signal and the synthesized voice signal. The use of such message device 4 makes it possible that the office information system of the present embodiment provides easier searching and recognition of a location of a failure in the system and allows more efficient failure recovery in the system.

Figure 4:
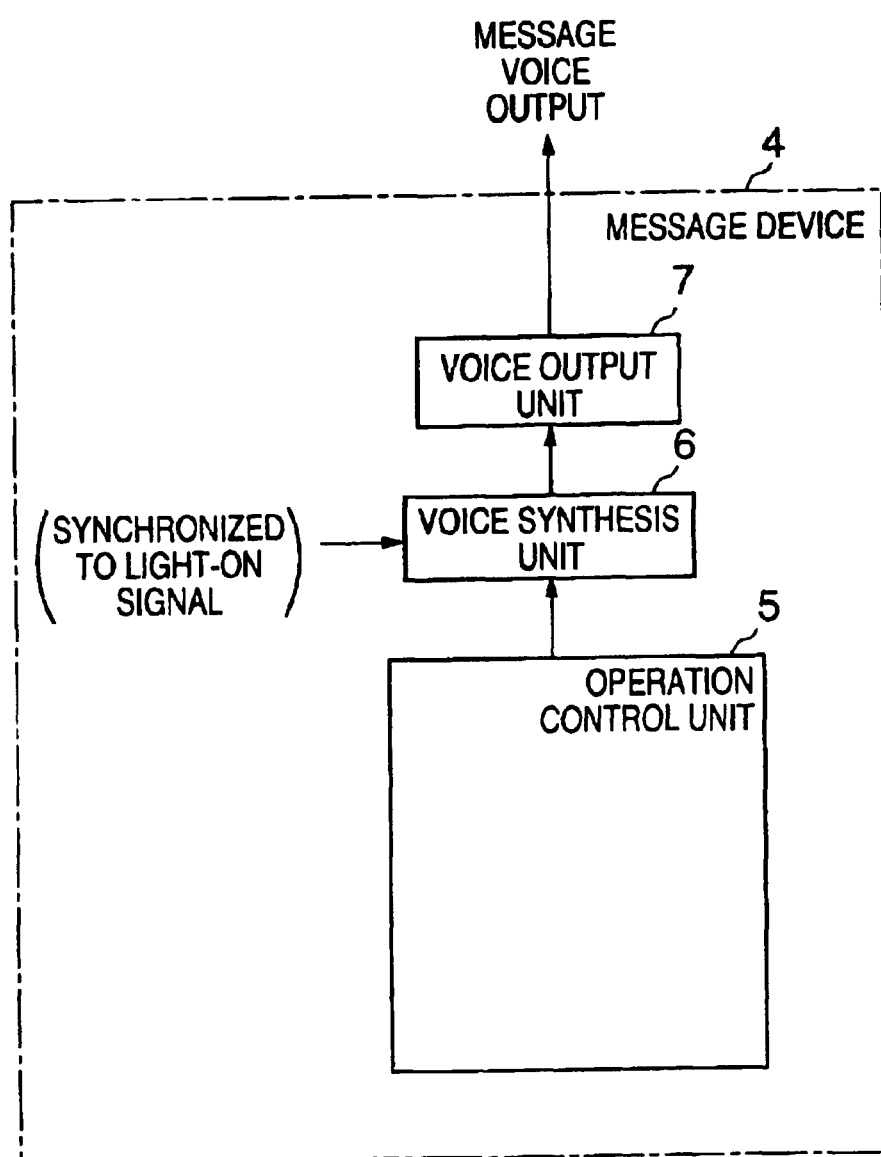
FIG. 4 is a block diagram of a message device in the office information system of the present embodiment.

FIG. 4 is a block diagram of the above message device 4 in the office information system of the present embodiment. This message device 4 is configured to output both a light-on signal and a synthesized voice signal synchronized to the light-on signal when a voice output mode of the system is selected by the user.

Similar to the embodiment of FIG. 3, the message device 4 in this embodiment includes a plurality of optical-output indicators, provided adjacent to the respective internal components of the system, each of which lights up in response to a light-on signal that indicates the subsequent location in the system.

The message device 4 further includes, as shown in FIG. 4, an operation control unit 5, a voice synthesis unit 6, and a voice output unit 7. In synchronism with the light-on signal, the voice synthesis unit 6 generates a synthesized voice signal indicating a subsequent location of the locating path following a reached location in the system. This synthesized voice signal is supplied from the voice synthesis unit 6 to the voice output unit 7. The voice output unit 7 is, for example, a speaker. The voice output unit 7 outputs a synthesized voice in accordance with the synthesized voice signal output from the voice synthesis unit 6. The operation control unit 5 allows the voice synthesis unit 6 to generate the synthesized voice signal when the voice output mode of the system is selected by the user. The operation control unit 5 includes, for example, a selection switch. In the present embodiment, when the selection switch on the operation control unit 5 is turned on by the user, the voice output mode is selected.

In the office information system of the above-mentioned embodiment, when the necessity of the voice output mode on the system arises, the message device 4 can output the synthesized voice signal synchronized to the light-on signal. On the other hand, when the voice output mode is not selected by the user (or when the selection switch is turned off by the user), the outputting of the synthesized voice signal by the voice synthesis unit 6 is inhibited.

Figure 5:
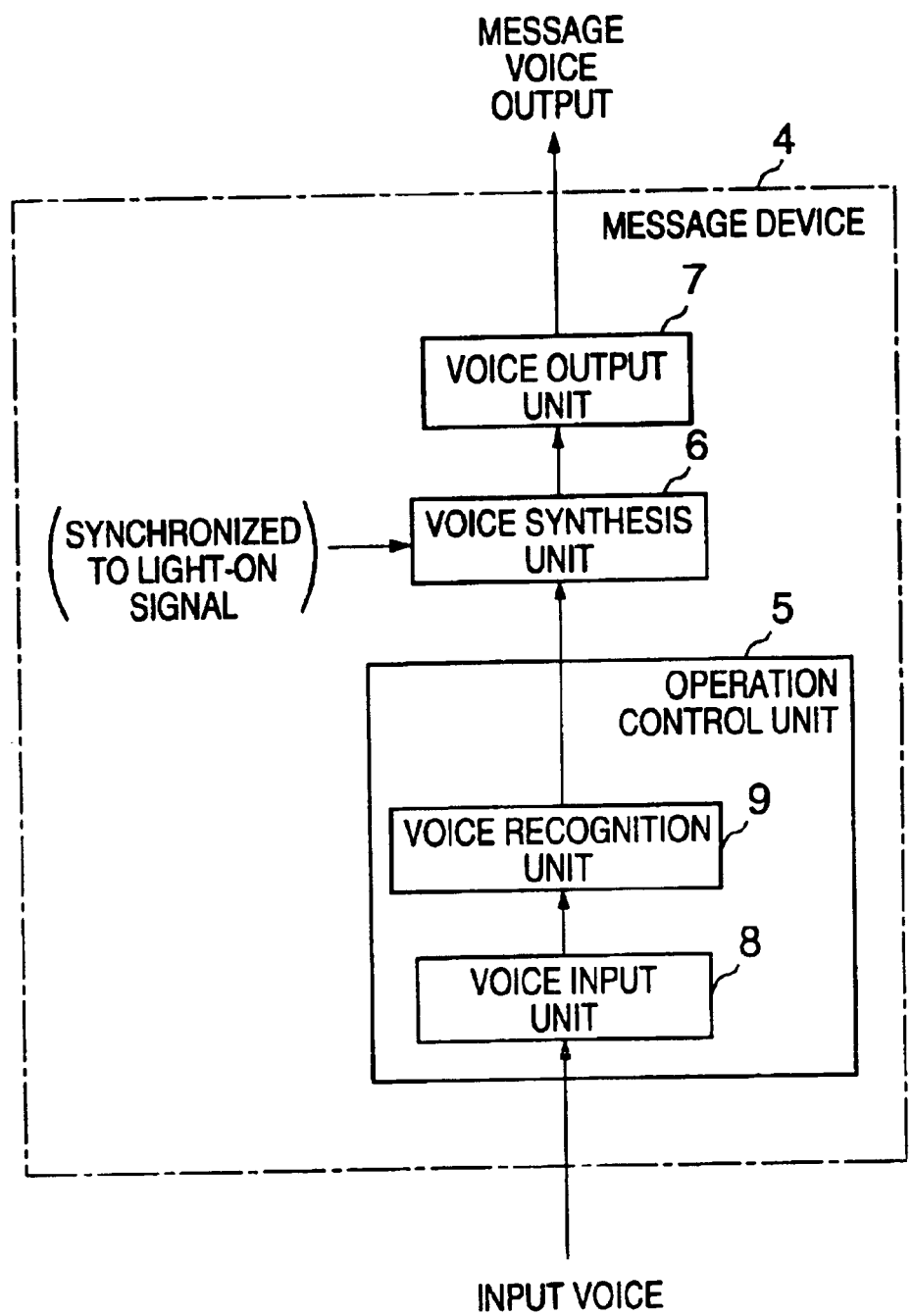
FIG. 5 is a block diagram of an operation control unit in the message device of FIG. 4.

FIG. 5 is a block diagram of the operation control unit 5 in the message device 4 of FIG. 4.

As shown in FIG. 5, the operation control unit 5 includes a voice input unit 8 and a voice recognition unit 9. The voice input unit 8 converts an input voice from the user into an electrical signal. The voice recognition unit 9 recognizes the electrical signal, produced by the voice input unit 8, as being the selection of the voice output mode.

The operation control unit 5 of FIG. 5 allows the voice synthesis unit 6 to generate the synthesized voice signal when the electrical signal is recognized by the voice recognition unit 9 as being the selection of the voice output mode, so that the subsequent location indicated by the synthesized voice is provided to the user. The use of the operation control unit 5 of FIG. 5 makes it possible that the user supplies the input voice to the voice input unit 8 in order to select the voice output mode of the system, instead of turning on the selection switch by hand.

Figure 6:
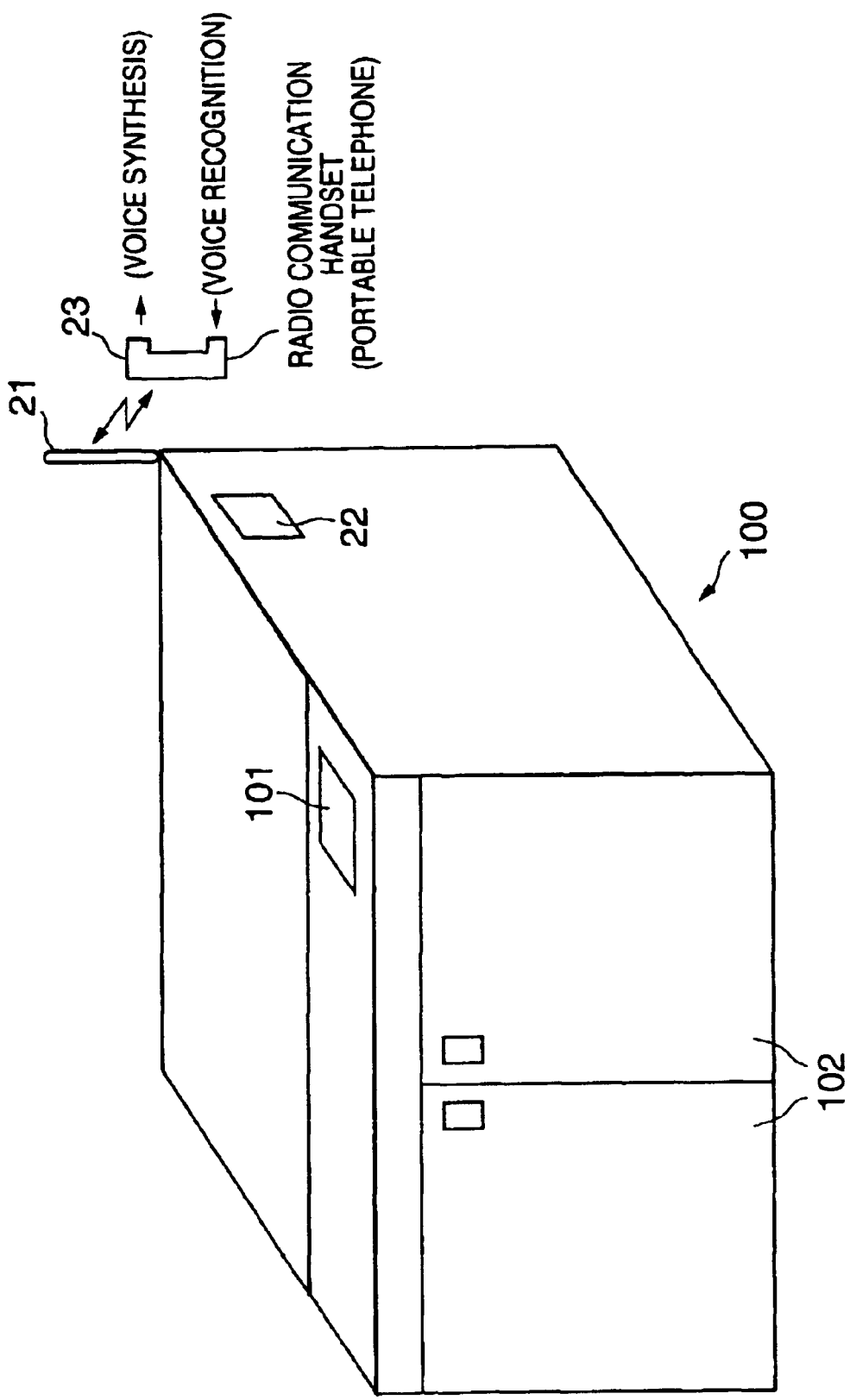
FIG. 6 is a diagram showing a variation of the office information system of the present embodiment.

FIG. 6 shows a variation of the office information system of the present embodiment.

The office information system of FIG. 6 further includes an internal antenna 21, a transmitter/receiver device 22, and a radio communication handset 23. The radio transmitter/receiver unit 22 is coupled to the message device 4, and communicates with the radio communication handset 23 by a radio signal. In the office information system, when the transmitter/receiver unit 22 receives an input radio signal from the handset 23, the input radio signal indicating the selection of the voice output mode from the user, the operation control unit 5 allows the voice synthesis unit 6 to generate the synthesized voice signal, and when a synthesized voice is output from the message device 5, the transmitter/receiver unit 22 transmits an output radio signal carrying the synthesized voice to the handset 23.

In the embodiment of FIG. 6, the radio communication handset 23 is, for example, a portable telephone. It is not necessary that the user stays adjacent to the voice input unit 8 in the office information system, because of the use of the portable telephone 23. The office information system of the present embodiment is more effective in providing easy searching and recognition of a location of a failure in the system and in providing the user with a failure-recovery operational message that allows efficient failure recovery in the system.

Figure 7:
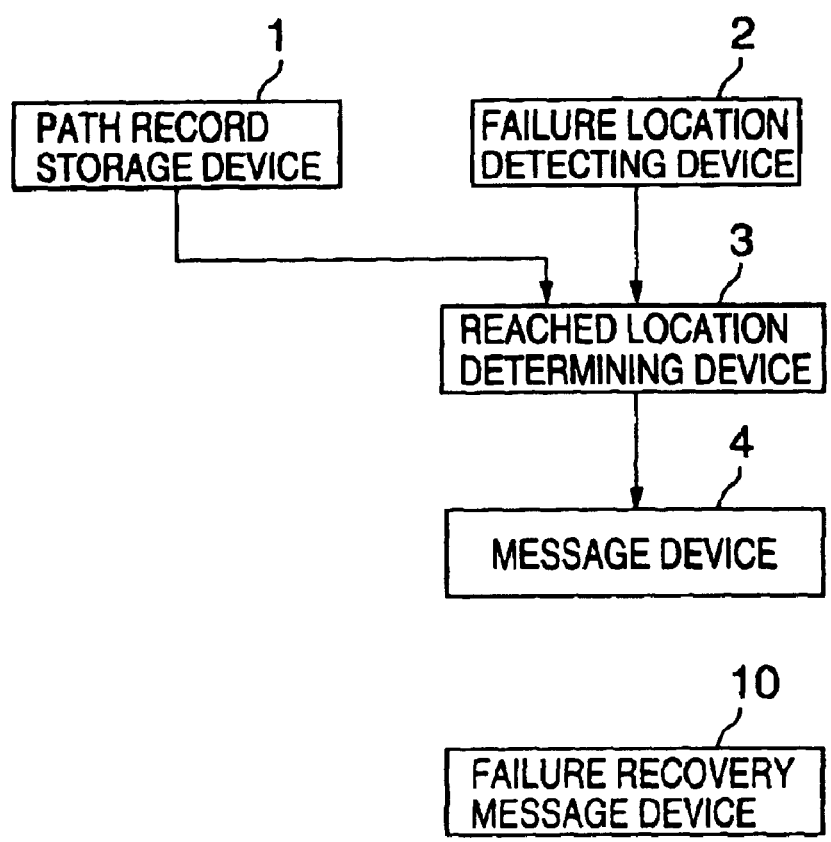
FIG. 7 is a block diagram of another variation of the office information system of the present embodiment.

FIG. 7 is a block diagram of another variation of the office information system of the present embodiment.

The office information system of FIG. 7 further includes a failure recovery message device 10 in addition to the elements of the embodiment of FIG. 1. The failure recovery message device 10 provides the user with a failure recovery message that indicates whether or not the recovery of the failure in the system is completed.

Specifically, the failure recovery message device 10 controls the LCD panel on the top of the enclosure of the system, so that the failure recovery message is displayed on the LCD panel, in order to notify the user of the completion of the failure recovery in the system. Alternatively, the failure recovery message device 10 may output a synthesized voice indicating that the recovery of the failure in the system is completed. This enables the user to safely recognize the completion of the failure recovery in the system.

Figure 11:
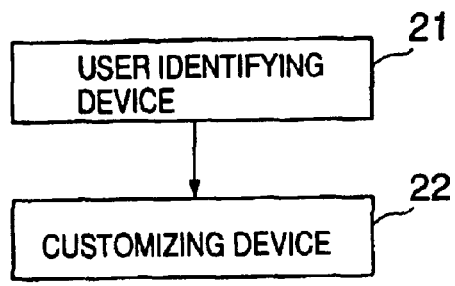
FIG. 11 is a block diagram of a second embodiment of the office information system according to the invention.

Next, FIG. 11 is a block diagram of a second embodiment of the office information system according to the invention. The office information system of the present embodiment is applicable to copier systems, facsimile systems or printer systems.

As shown in FIG. 11, the office information system of the present embodiment includes a user identifying device 21 and a customizing device 22. The user identifying device 21 authenticates a personal identification by receiving a user ID. The customizing device 22 generates a customized operational message of the system appropriate for a user whose identification is authenticated by the user identifying device 21.

The office information system of FIG. 11 is effective in setting the customized operational messages of the system appropriate for individual users, and in increasing the operability of the system for the individual users by the use of the customized operational messages.

Specifically, in the present embodiment, the user identifying device 21 checks an IC card with a user ID recorded therein, and authenticates a personal identification by using the user ID obtained from the IC card.

Alternatively, the user identifying device 21 may be configured to accept a call from a portable telephone and receive a caller ID number from the portable telephone. The user identifying device 21 of this embodiment authenticates a personal identification by using the caller ID number obtained from the portable telephone.

Figure 12:
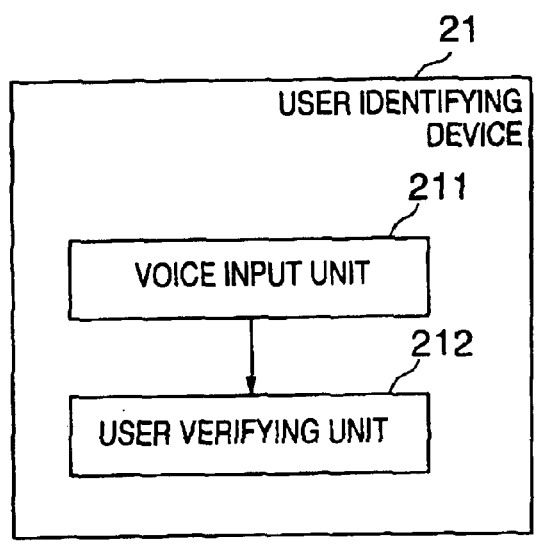
FIG. 12 is a block diagram of a user identifying device in the office information system of the present embodiment.

FIG. 12 is a block diagram of a user identifying device 21 in the office information system of the present embodiment.

The user identifying device 21 of FIG. 12 includes a voice input unit 211 and a user verifying unit 212. The voice input unit 211 receives an input voice from a user, the input voice indicating a user ID of that user. The user verifying unit 212 compares the input voice with a pre-recorded user ID. When the input voice matches the pre-recorded user ID, the user verifying unit 212 authenticates the personal identification of that user.

Alternatively, the user identifying device 21 may be configured to receive a user ID which is manually inputted by the user on a control panel (not shown) of the system.

Figure 13:
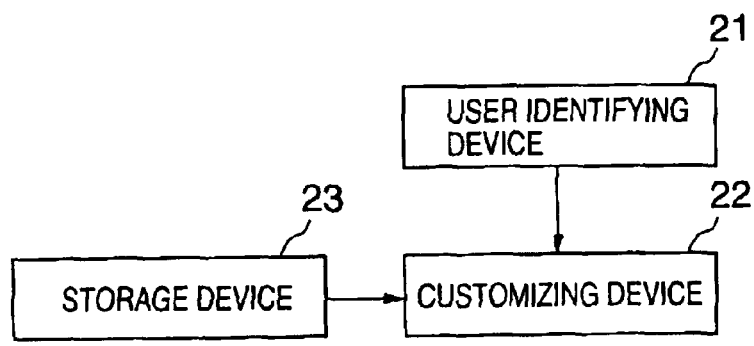
FIG. 13 is a block diagram of a variation of the office information system of the present embodiment.

FIG. 13 is a block diagram of a variation of the office information system of the present embodiment. In FIG. 13, the elements which are essentially the same as corresponding elements in FIG. 11 are designated by the same reference numerals.

The office information system of FIG. 13 includes a user identifying device 21 which authenticates a personal identification by receiving a user ID. A customizing device 22 generates a customized one-touch-key or address message of the system appropriate for a user whose identification is authenticated by the user identifying device 21. A storage device 23 stores one-touch-key records or address-note records of a number of users, each user having a different user ID, and each record indicating one-touch-key data or address-note data of one of the number of users. In this office information system, the customizing device 22 reads the one-touch-key record or the address-note record of the user, whose identification is authenticated, from the storage device 23. The customizing device 22 detects the one-touch-key data or the address-note data of the user from the read record, and updates the customized one-touch-key or address message in accordance with the detected data.

The office information system of the present embodiment is effective in setting the customized one-touch-key or address messages of the system appropriate for individual users, and in increasing the operability of the system for the individual users by the use of the customized one-touch-key or address messages.

Figure 14:
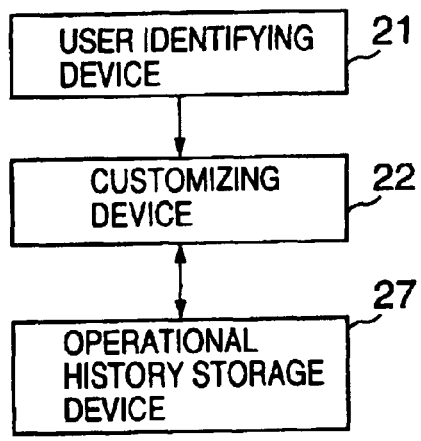
FIG. 14 is a block diagram of another variation of the office information system of the present embodiment.

FIG. 14 is a block diagram of another variation of the office information system of the present embodiment. In FIG. 14, the elements which are essentially the same as corresponding elements in FIG. 11 are designated by the same reference numerals.

The office information system of FIG. 14 includes a user identifying device 21 which authenticates a personal identification by receiving a user ID. A customizing device 22 generates a customized operational message of the system appropriate for a user whose identification is authenticated by the user identifying device 21. An operational history storage device 27 stores operational history records of a number of users, each user having a different user ID, and each history record indicating an operational characteristic of one of the number of users. In this office information system, the customizing device 22 reads an operational history record of the user, whose Identification is authenticated, from the operational history storage device 27. The customizing device 22 detects the operational characteristic of the user from the read history record, and updates the customized operational message in accordance with the detected operational characteristic.

Specifically, in the above-described embodiment, the operational history storage device 27 stores a voice command table containing individual voice command records of a number of users, each voice command record indicating a voice command of one of the users. The customizing device 22 reads a voice command of the user, whose identification is authenticated, from the operational history storage device 27. The customizing device 22 detects the operational characteristic of the user from the read voice command record, and updates the customized voice command in accordance with the detected operational characteristic.

The office information system of the present embodiment is effective in setting the customized operational messages of the system appropriate for individual users and in increasing the operability of the system for the individual users by the use of the customized operational messages.

Figure 15:
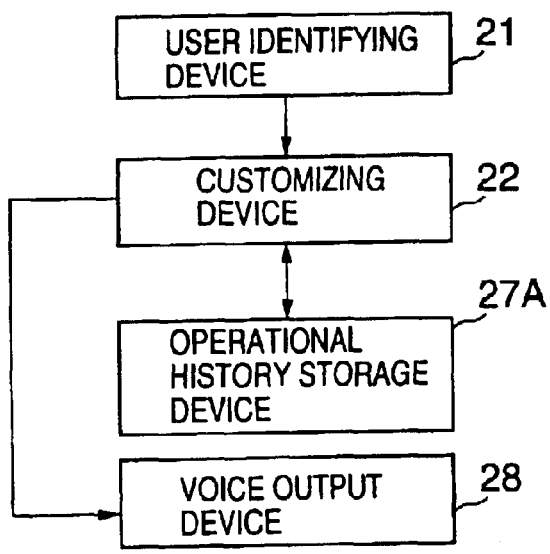
FIG. 15 is a block diagram of another variation of the office information system of the present embodiment.

FIG. 15 is a block diagram of another variation of the office information system of the present embodiment. In FIG. 15, the elements which are essentially the same as corresponding elements in FIG. 11 are designated by the same reference numerals.

The office information system of FIG. 15 includes a user identifying device 21 which authenticates a personal identification by receiving a user ID. A customizing device 22 generates a customized operational message of the system appropriate for a user whose identification is authenticated by the user identifying device 21. An operational history storage device 27A stores operational history records of a number of users, each user having a different user ID, and each history record indicating an operational characteristic of one of the number of users. A voice output device 28 produces a synthesized voice according to the customized operational message output from the customizing device 22. In this office information system, the customizing device 22 reads an operational history record of the user, whose identification is authenticated, from the operational history storage device 27A. The customizing device 22 detects the operational characteristic of the user from the read history record, and updates the customized operational message in accordance with the detected operational characteristic.

Specifically, in the above-described embodiment, the operational history storage device 27A stores a total time of use of the system with respect to each of the number of users, in addition to the operational history records. The customizing device 22 detects the total time of use of the system of the user from the read history record, and modifies the level of expertise related to the customized operational message (to an appropriate level among beginner, expert and other levels) in accordance with the detected time of use.

Figure 16:
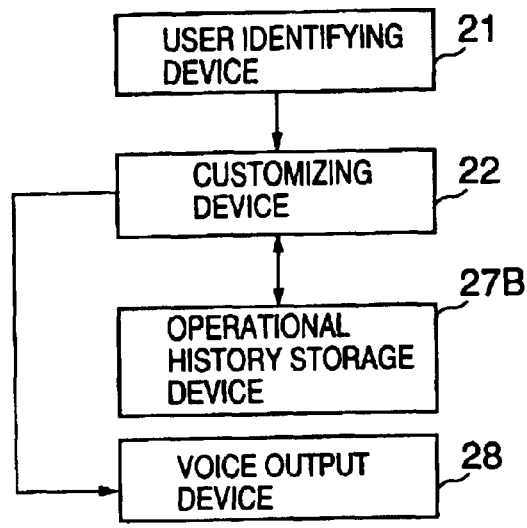
FIG. 16 is a block diagram of another variation of the office information system of the present embodiment.

FIG. 16 is a block diagram of another variation of the office information system of the present embodiment. In FIG. 16, the elements which are essentially the same as corresponding elements in FIG. 15 are designated by the same reference numerals, and a description thereof will be omitted.

Specifically, the office information system of FIG. 16 includes an operational history storage device 27B which stores an operational behavior on the system with respect to each of the users, in addition to the operational history records. The customizing device 22 detects the operational behavior on the system for the user from the read history record, and updates the customized operational message in accordance with the detected operational behavior. The voice output device 28 produces a synthesized voice according to the customized operational message output from the customizing device 22. Hence, the present embodiment can make the synthesized voice at the output of the voice output device 28 appropriate for the individual users.

Figure 17:
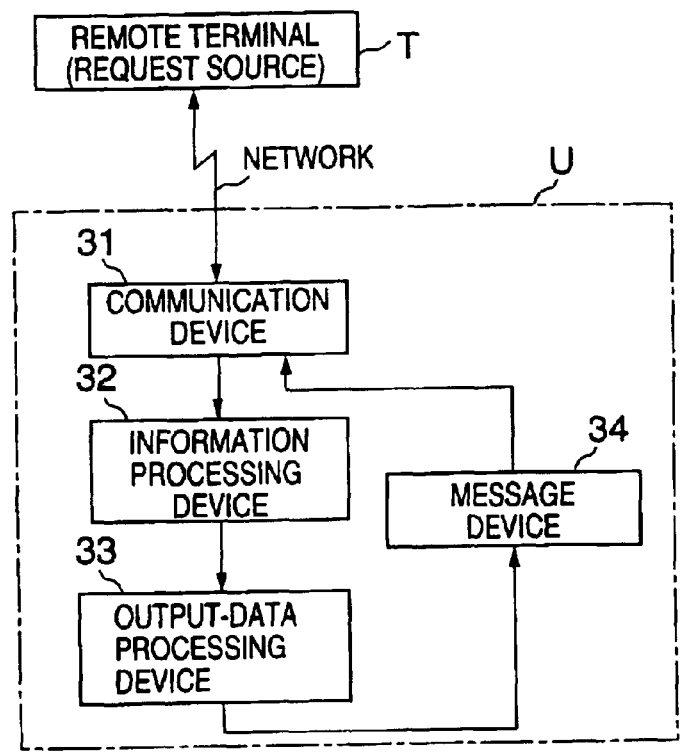
FIG. 17 is a block diagram of a third embodiment of the office information system according to the invention.

Next, FIG. 17 is a block diagram of a third embodiment of the office information system according to the invention. The office information system of this embodiment is applicable to image forming systems having a communication device, such as copier systems, facsimile systems or printer systems.

As shown in FIG. 17, the office information system U of the present embodiment is linked to a remote terminal T via a network. The remote terminal T is, for example, a personal computer, a printer, a telephone or a facsimile. Herein, the remote terminal T is considered a request source to the office information system U.

The office information system U includes a communication device 31 which is linked to the remote terminal T via the network for telecommunications between the system U and the remote terminal T. An information processing device 32 produces a reconstructed image when an image sent by the remote terminal T (the request source) via the network is received at the communication device 31. An output-data processing device 33 determines whether the reconstructed image output from the information processing device 33 is defective in image quality. When the reconstructed image is determined as being defective, a message device 34 supplies an error message, indicating that an error occurs in the outputting of the image received at the system, to the communication device 31, so that the error message is transmitted from the office information system U to the remote terminal T via the network.

The office information system of the above-described embodiment is effective in safely transmitting an error message from the system to the remote terminal when an error occurs in the outputting of the image by the system. When an image from the remote terminal (e.g., a facsimile) is received at the office information system (e.g., an image forming system having a facsimile transmission function) but a defective image is reconstructed by the system due to lack of ink or toner, the operator on the remote terminal is uncertain of whether the reconstructed image is properly output by the office information system. The office information system of the above-described embodiment can automatically transmit the error message to the remote terminal if an error occurs at the office information system.

Figure 18:
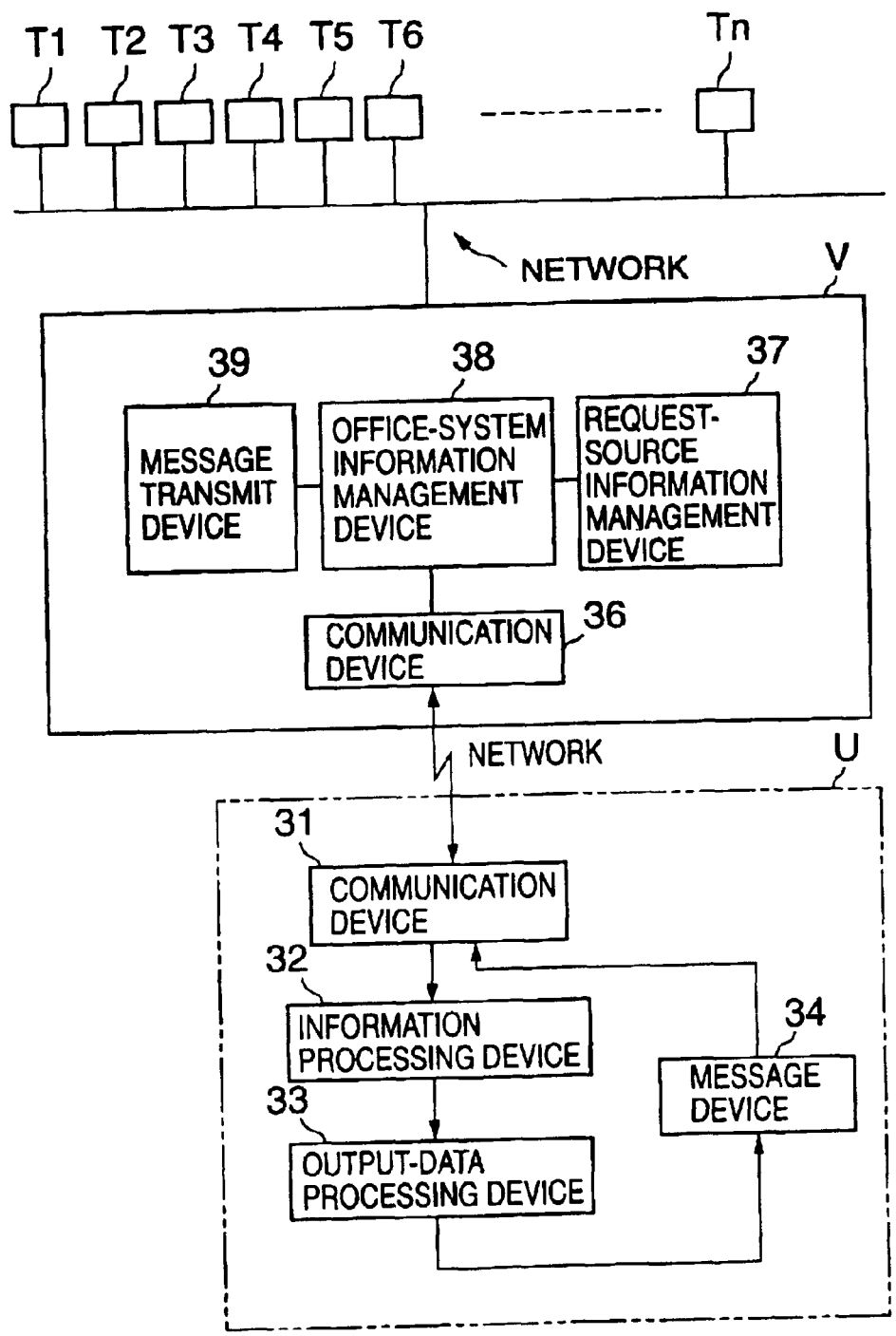
FIG. 18 is a block diagram of a variation of the office information system of the present embodiment.

FIG. 18 is a block diagram of a variation of the office information system of the present embodiment. In FIG. 18, the elements which are essentially the same as corresponding elements in FIG. 17 are designated by the same reference numerals.

As shown in FIG. 18, the office information system of the present embodiment includes an office information system U and an information management system V. The office information system U is linked to the information management system V via a network (e.g., a public telephone network or the Ethernet). The information management system V is linked to a plurality of remote terminals T1, T2, . . . , Tn via the network. The information management system V manages information transmitted between the office information system U and the remote terminals T1, T2, . . . , Tn via the network.

The remote terminals T1, T2, . . . , Tn are, for example, personal computers, printers, telephone sets or facsimiles. For the sake of convenience, suppose that the remote terminals T1, T2 and Tn are facsimiles, the remote terminal T3 is a personal computer having an electronic mail function, the remote terminal T5 is a telephone set, and the remote terminal T6 is a printer.

In the office information system of the above-described embodiment, the information management system V includes a communication device 36, a request-source information management device 37, an office-system information management device 38, and a message transmit device 39. The communication device 36 is linked to the office information system U via the network for telecommunications between the system V and the system U. The request-source information management device 37 stores transmit data IDs and request-source records corresponding to the respective transmit data IDs.

In the office information system U of the above-described embodiment, the communication device 31 is linked to the system V via the network for telecommunications between the system U and the system V. The information processing device 32 produces a reconstructed image when an image sent by a certain remote terminal (the request source) via the network is received at the communication device 31. The output-data processing device 33 determines whether the reconstructed image output from the information processing device 33 is defective in image quality. When the reconstructed image is determined as being defective, the message device 34 supplies an error message, indicating that an error occurs in the outputting of the image by the system, to the communication device 31, so that the error message is transmitted from the office information system U to the information management system V via the network.

When an image is transmitted by a certain remote terminal (the request source) via the network, the information management system V stores a transmit data ID for the image in the request-source information management device 37, inserts the transmit data ID into the image, and transmits the image with the transmit data ID from the system V to the system U via the network. When an error massage is transmitted by the system U via the network, the office-system information management device 38 of the system V manages the error massage, and the information management system V transmits the error message to the specific one (the request source) of the remote terminals T1, T2, . . . , Tn via the network.

FIG. 19 is a diagram for explaining request-source records stored in the information management system V of the office information system of FIG. 18.

As described above, the request-source records, shown in FIG. 19, are stored in the request-source information management device 37 of the information management system V. The request-source information is needed to transmit the error message from the office information system U to a specific one of the remote terminals T1, T2, . . . , Tn via the network. As shown in FIG. 19, each request-source record, stored in the device 37, includes a transmit data ID, a transmit date/time, a destination phone No., a transmit terminal, a message receiving terminal, a destination device address, and a name of requesting person.

As shown in FIG. 19, in the message receiving terminal field of each request-source record, the specific one of the remote terminals to which the error message is sent is recorded. In the destination device address field of each request-source record, the electronic mail address, the facsimile device number or the telephone number of the message receiving terminal is recorded. In the requesting person name field of each request-source record, the name of the person who receives the error message is recorded.

Figure 20:
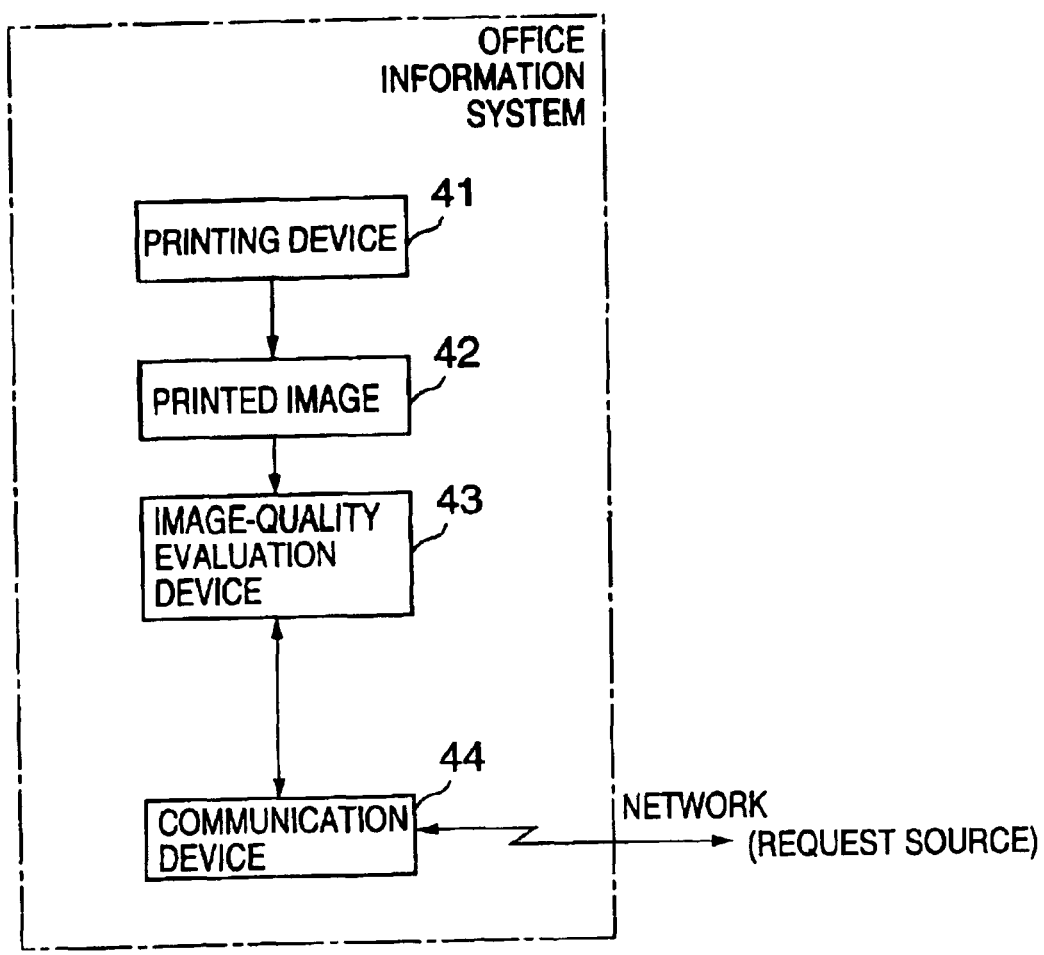
FIG. 20 is a block diagram of a fourth embodiment of the office information system according to the invention.

Next, FIG. 20 is a block diagram of a fourth embodiment of the office information system according to the invention. The office information system of the present embodiment is applicable to image forming systems having a communication device, such as copier systems, facsimile systems or printer systems.

The office information system of FIG. 20 includes a printing device 41 which produces a printed image 42. An image-quality evaluation device 43 produces a result of evaluation of a quality of the printed image 42 every time the printed image is output by the printing device 41. The image-quality evaluation device 43 is coupled to a communication device 44, and the communication device 44 is linked to a remote terminal (not shown) via a network for telecommunications between the system and the remote terminal.

In the office information system of FIG. 20, when an image-quality message request from the remote terminal (or the request source) is received at the communication device 44, the communication device 44 transmits an operational message, indicating the result of the evaluation output from the image-quality evaluation device 43, back to the remote terminal via the network. Specifically, when the image-quality message request is received at the communication device 44, the communication device 44 sends a control signal to the image-quality evaluation device 43 so that the image-quality evaluation device 43 produces a result of evaluation of a quality of the printed image 42 output by the printing device 41. Then, the communication device 44 transmits an operational message, indicating the result of the evaluation, to the remote terminal via the network. This enables the user on the remote terminal to easily receive the operational message of the office information system. The office information system of the present embodiment makes it possible to provide the user on the remote terminal with the operational message of the system when an image-quality message request from the remote terminal is received.

Figure 21:
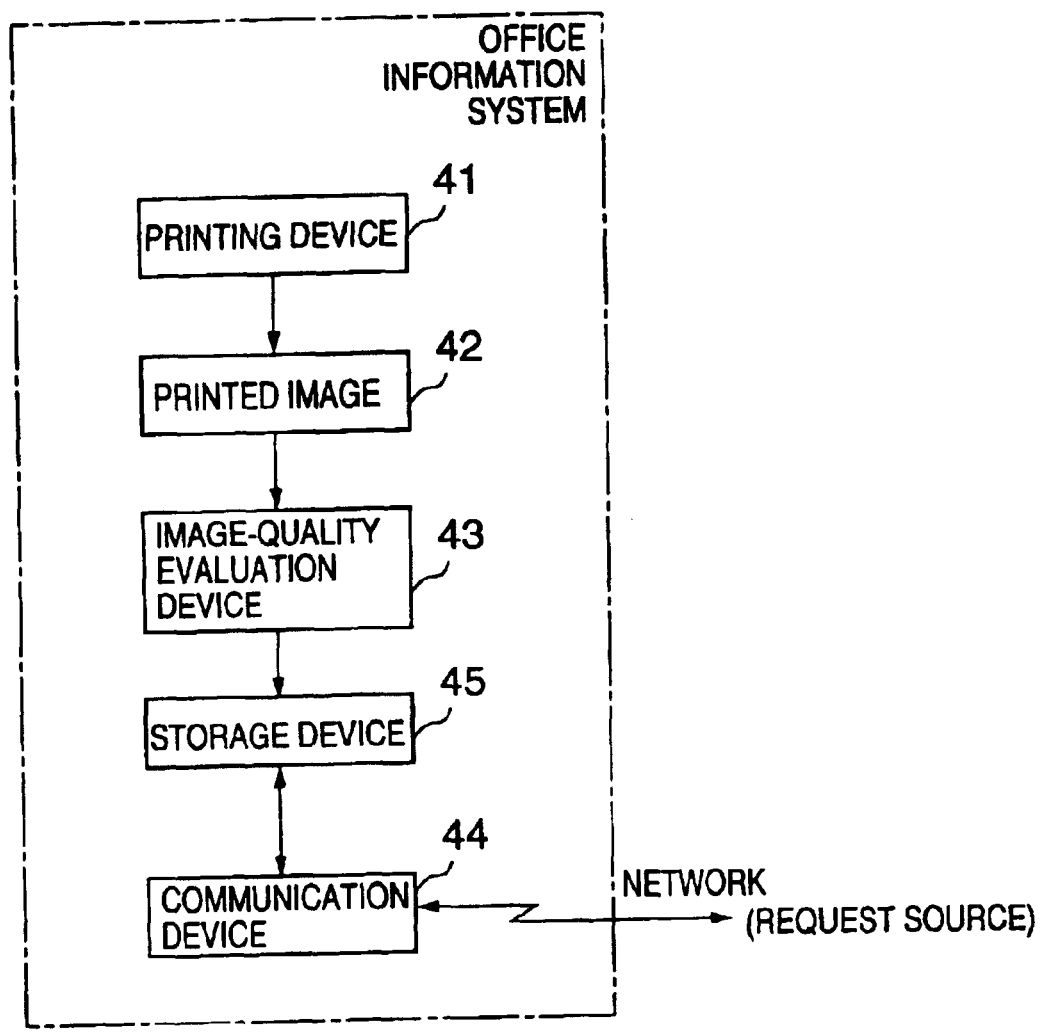
FIG. 21 is a block diagram of a variation of the office information system of the present embodiment.

FIG. 21 is a block diagram of a variation of the office information system of the present embodiment. In FIG. 21, the elements which are essentially the same as corresponding elements in FIG. 20 are designated by the same reference numerals.

The office information system of FIG. 21 includes a printing device 41 which produces a printed image 42. An image-quality evaluation device 43 produces a result of evaluation of a quality of the printed image 42 every time the printed image is output by the printing device 41. A storage device 45 stores the result of evaluation output by the image-quality evaluation device 43. The storage device 45 is coupled to a communication device 44, and the communication device 44 is linked to a remote terminal (not shown) via a network for telecommunications between the system and the remote terminal.

Figure 22:
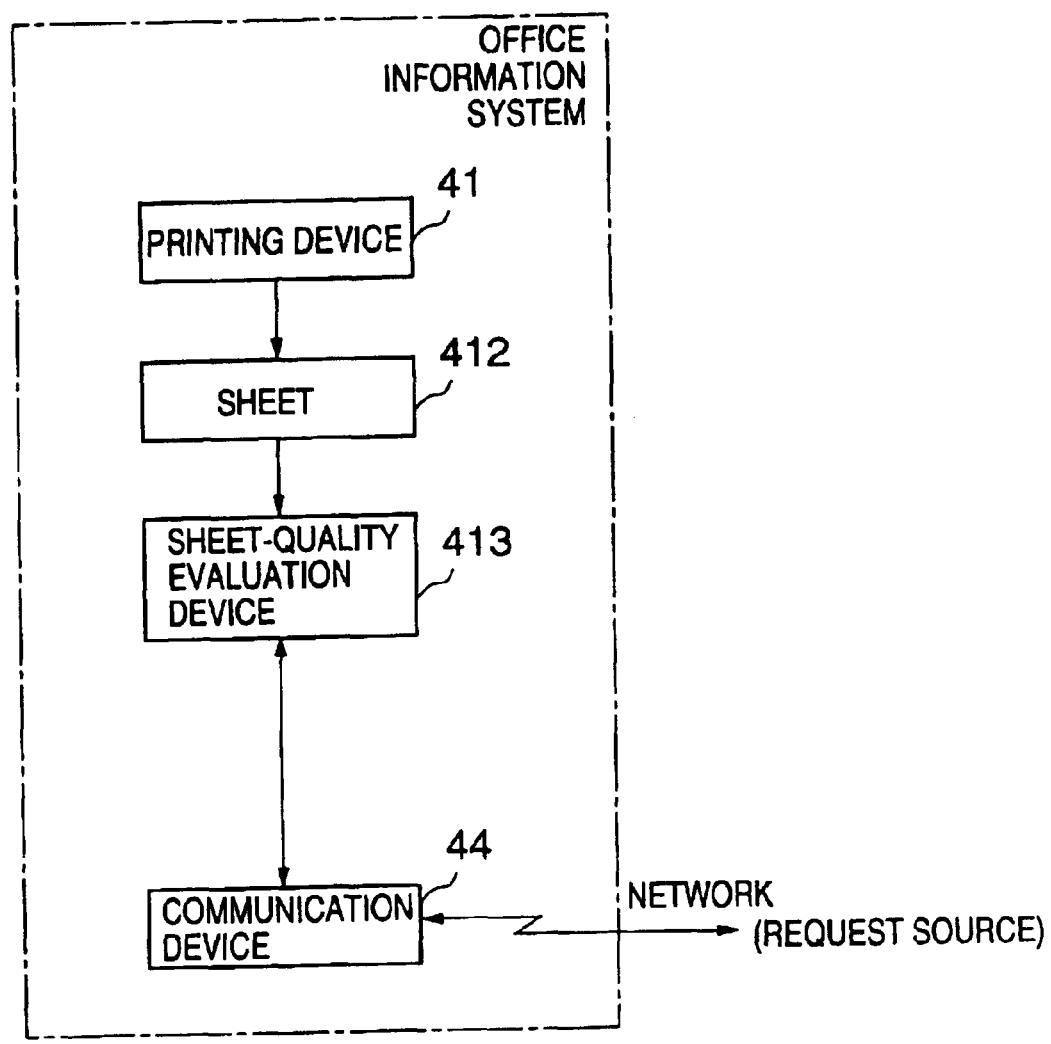
FIG. 22 is a block diagram of another variation of the office information system of the present embodiment.

In the office information system of FIG. 22, a latest result of the image-quality evaluation that is output by the image-quality evaluation device 43 is stored in the storage device 45, and the communication device 44 transmits an operational message, indicating the stored latest result of the evaluation, to the remote terminal via the network when an image-quality message request from the remote terminal is received at the communication device 44.

In the office information system of the present embodiment, the latest result of the evaluation that is output by the image-quality evaluation device 43 is stored in the storage device 45, and the communication device 44 transmits an operational message, indicating the stored latest result of the evaluation, to the remote terminal via the network when an image-quality message request from the remote terminal is received at the communication device 44. The office information system of the present embodiment makes it possible to provide the user on the remote terminal with the operational message related to the latest evaluation result of the system when an image-quality message request from the remote terminal is received.

FIG. 22 is a block diagram of another variation of the office information system of the present embodiment. In FIG. 22, the elements which are essentially the same as corresponding elements in FIG. 20 are designated by the same reference numerals.

The office information system of FIG. 22 includes a printing device 41 which produces a printed image on a copy sheet 412. A sheet-quality evaluation device 413 produces a result of evaluation of a quality of the copy sheet 412 every time the copy sheet is output by the printing device 41. The sheet-quality evaluation device 413 is coupled to a communication device 44, and the communication device 44 is linked to a remote terminal (not shown) via a network for telecommunications between the system and the remote terminal.

In the office information system of FIG. 22, when a sheet-quality message request from the remote terminal (or the request source) is received at the communication device 44, the communication device 44 transmits an operational message, indicating the result of the evaluation output from the sheet-quality evaluation device 413, back to the remote terminal via the network. Specifically, when the sheet-quality message request is received at the communication device 44, the communication device 44 sends a control signal to the sheet-quality evaluation device 413 so that the sheet-quality evaluation device 413 produces a result of evaluation of a quality of the copy sheet 412 output by the printing device 41. Then, the communication device 44 transmits an operational message, indicating the result of the evaluation, to the remote terminal via the network. This enables the user on the remote terminal to easily receive the operational message of the office information system. The office information system of the present embodiment makes it possible to provide the user on the remote terminal with the operational message of the system when a sheet-quality message request from the remote terminal is received.

Figure 23:
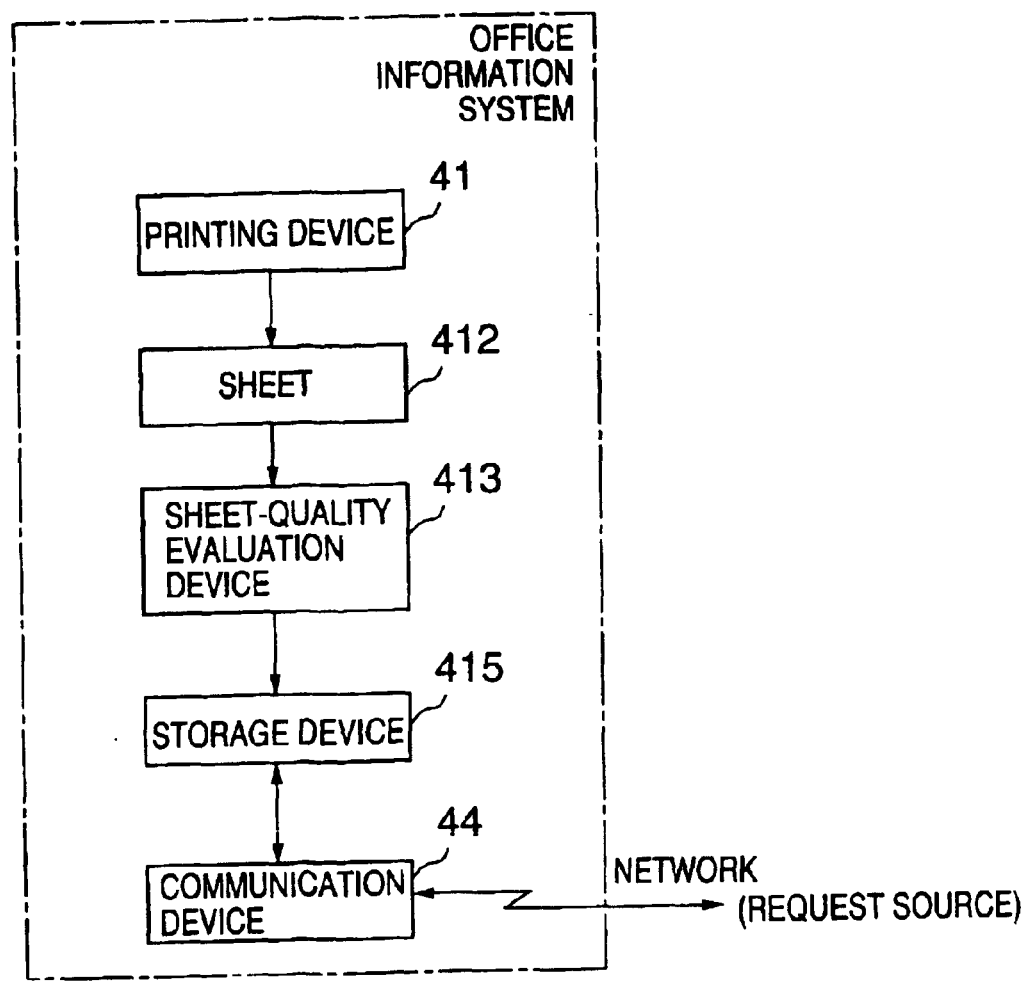
FIG. 23 is a block diagram of another variation of the office information system of the present embodiment.

FIG. 23 is a block diagram of another variation of the office information system of the present embodiment. In FIG. 23, the elements which are essentially the same as corresponding elements in FIG. 22 are designated by the same reference numerals.

The office information system of FIG. 23 includes a printing device 41 which produces a printed image on a copy sheet 412. A sheet-quality evaluation device 413 produces a result of evaluation of a quality of the copy sheet 412 every time the copy sheet is output by the printing device 41. A storage device 415 stores the result of evaluation output by the sheet-quality evaluation device 413. The storage device 415 is coupled to a communication device 44, and the communication device 44 is linked to a remote terminal (not shown) via a network for telecommunications between the system and the remote terminal.

In the office information system of FIG. 23, a latest result of the sheet-quality evaluation that is output by the sheet-quality evaluation device 413 is stored in the storage device 415, and the communication device 44 transmits an operational message, indicating the stored latest result of the evaluation, to the remote terminal via the network when a sheet-quality message request from the remote terminal is received at the communication device 44.

In the office information system of the present embodiment, the latest result of the evaluation that is output by the sheet-quality evaluation device 413 is stored in the storage device 415, and the communication device 44 transmits an operational message, indicating the stored latest result of the evaluation, to the remote terminal via the network when a sheet-quality message request from the remote terminal is received at the communication device 44. The office information system of the present embodiment makes it possible to provide the user on the remote terminal with the operational message related to the latest evaluation result of the system when a sheet-quality message request from the remote terminal is received.

Figure 24:
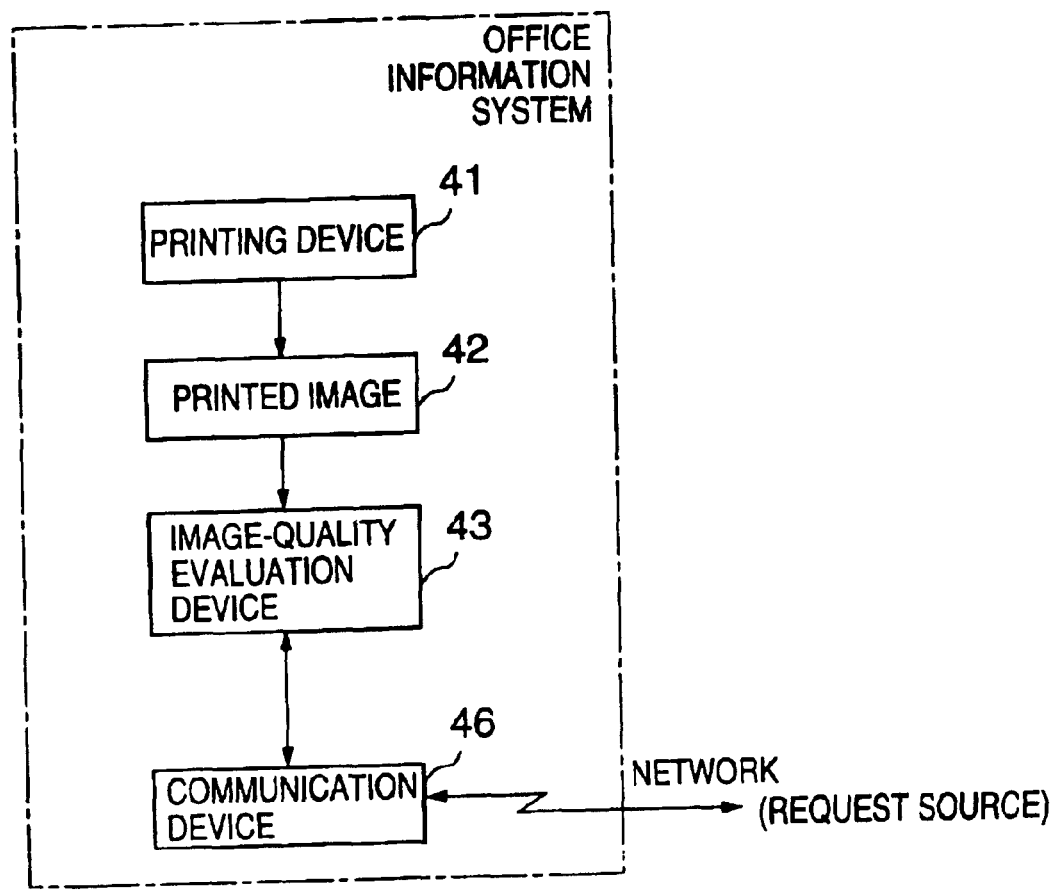
FIG. 24 is a block diagram of another variation of the office information system of the present embodiment.

FIG. 24 is a block diagram of another variation of the office information system of the present embodiment. In FIG. 24, the elements which are essentially the same as corresponding elements in FIG. 20 are designated by the same reference numerals.

The office information system of FIG. 24 includes a printing device 41 which produces a printed image 42. An image-quality evaluation device 43 produces a result of evaluation of a quality of the printed image 42 every time the printed image is output by the printing device 41. The image-quality evaluation device 43 is coupled to a communication device 46, and the communication device 46 is linked to a remote terminal (not shown) via a network for telecommunications between the system and the remote terminal.

In the office information system of FIG. 24, when an image-quality-specified message request is received from the remote terminal (or the request source) is received at the communication device 46, the communication device 46 transmits a printability message, indicating whether the office information system is in a printable state, back to the remote terminal via the network. Specifically, when the image-quality-specified message request is received at the communication device 46, the communication device 46 sends a control signal to the image-quality evaluation device 43 so that the image-quality evaluation device 43 produces a result of evaluation of a quality of the printed image 42 output by the printing device 41. When the evaluated quality of the printed image 42 meets the specified image quality of the received request, the communication device 46 transmits a printability message, indicating that the office information system is in a printable state, to the remote terminal via the network. Otherwise, the communication device 46 transmits a printability message, indicating that the office information system is not in a printable state, to the remote terminal via the network. This enables the user on the remote terminal to easily receive the printability message of the office information system. The office information system of the present embodiment makes it possible to provide the user on the remote terminal with the printability message of the system when an image-quality-specified message request from the remote terminal is received.

Figure 25:
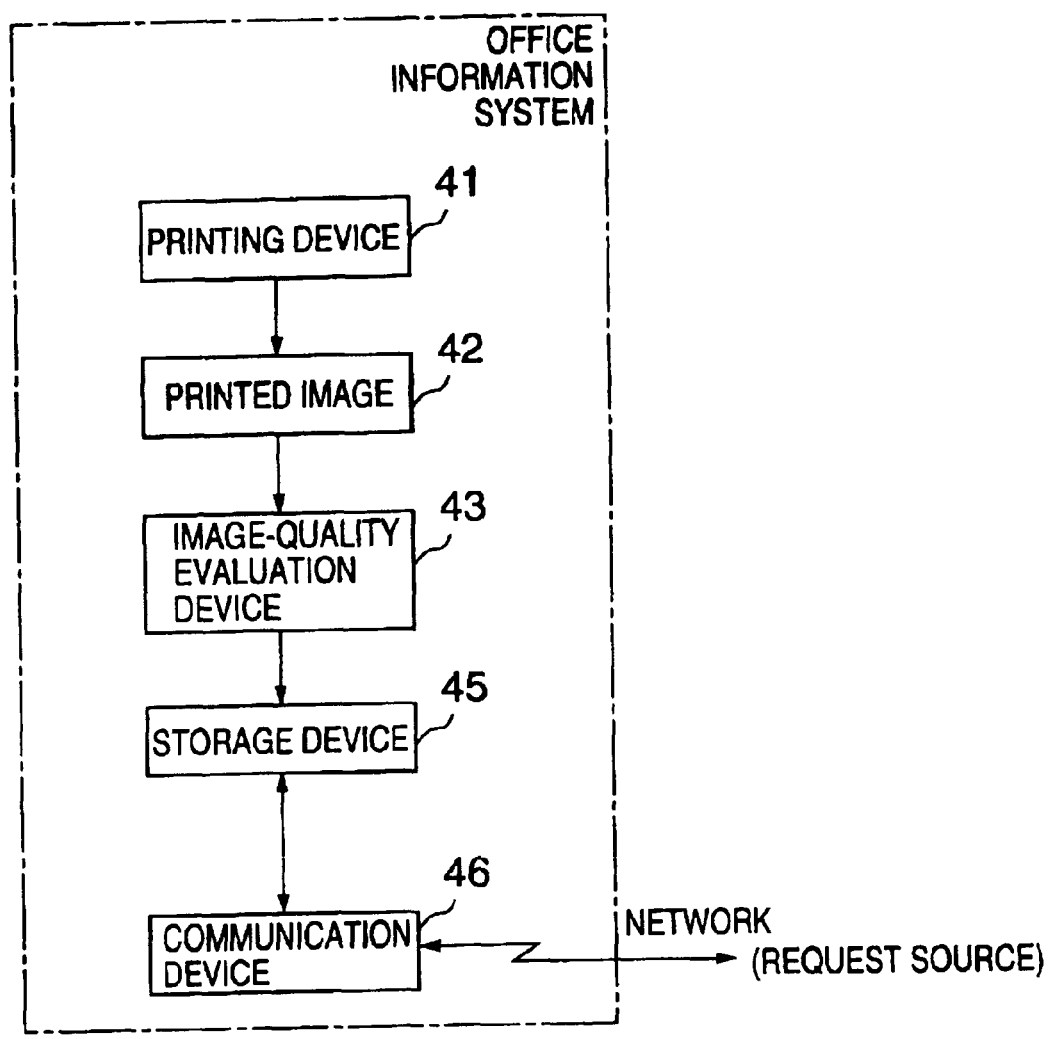
FIG. 25 is a block diagram of another variation of the office information system of the present embodiment.

FIG. 25 is a block diagram of another variation of the office information system of the present embodiment. In FIG. 25, the elements which are essentially the same as corresponding elements in FIG. 24 are designated by the same reference numerals.

The office information system of FIG. 25 includes a printing device 41 which produces a printed image 42. An image-quality evaluation device 43 produces a result of evaluation of a quality of the printed image 42 every time the printed image is output by the printing device 41. A storage device 45 stores the result of evaluation output by the image-quality evaluation device 43. The storage device 45 is coupled to a communication device 46, and the communication device 46 is linked to a remote terminal (not shown) via a network for telecommunications between the system and the remote terminal.

In the office information system of FIG. 25, a latest result of the image-quality evaluation that is output by the image-quality evaluation device 43 is stored in the storage device 45, and the communication device 46 transmits a printability message, indicating whether the office information system is in a printable state, to the remote terminal via the network when an image-quality-specified message request from the remote terminal is received at the communication device 46.

In the office information system of the present embodiment, the latest result of the evaluation that is output by the image-quality evaluation device 43 is stored in the storage device 45. Specifically, when the image-quality-specified message request is received at the communication device 46, the communication device 46 sends a control signal to the storage device 45 so that the latest result of the evaluation is read from the storage device 45. When the latest evaluation quality from the storage device 45 meets the specified image quality of the received request, the communication device 46 transmits a printability message, indicating that the office information system is in a printable state, to the remote terminal via the network. Otherwise, the communication device 46 transmits a printability message, indicating that the office information system is not in a printable state, to the remote terminal via the network. This enables the user on the remote terminal to easily receive the printability message of the office information system. The office information system of the present embodiment makes it possible to provide the user on the remote terminal with the printability message of the system when an image-quality-specified message request from the remote terminal is received.

Figure 26:
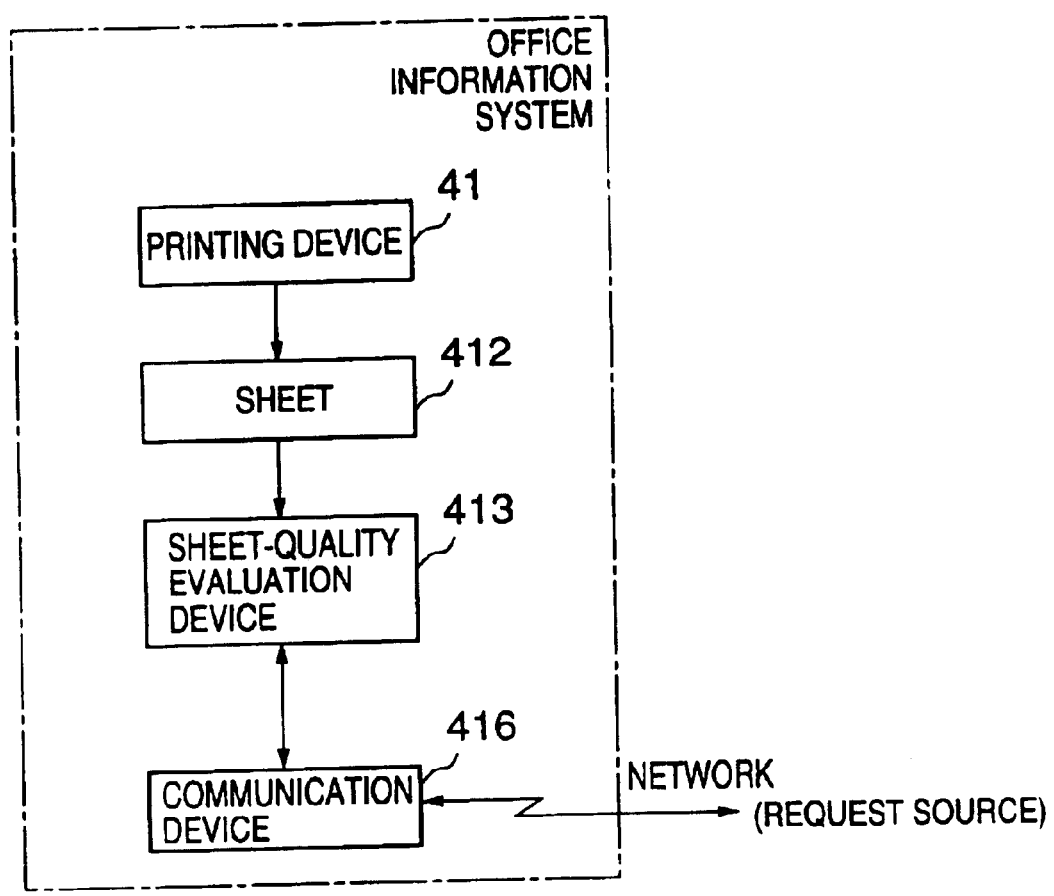
FIG. 26 is a block diagram of another variation of the office information system of the present embodiment.

FIG. 26 is a block diagram of another variation of the office information system of the present embodiment. In FIG. 26, the elements which are essentially the same as corresponding elements in FIG. 22 are designated by the same reference numerals.

The office information system of FIG. 26 includes a printing device 41 which produces a printed image on a copy sheet 412. A sheet-quality evaluation device 413 produces a result of evaluation of a quality of the copy sheet 412 every time the copy sheet is output by the printing device 41. The sheet-quality evaluation device 413 is coupled to a communication device 416, and the communication device 416 is linked to a remote terminal (not shown) via a network for telecommunications between the system and the remote terminal.

In the office information system of FIG. 26, when a sheet-quality-specified message request from the remote terminal (or the request source) is received at the communication device 416, the communication device 416 transmits a printability message, indicating whether the office information system is in a printable state, back to the remote terminal via the network. Specifically, when the sheet-quality-specified message request is received at the communication device 416, the communication device 416 sends a control signal to the sheet-quality evaluation device 413 so that the sheet-quality evaluation device 413 produces a result of evaluation of a quality of the copy sheet 412 output by the printing device 41. When the evaluated sheet quality meets the specified sheet quality of the received request, the communication device 416 transmits a printability message, indicating that the office information system is in a printable state, to the remote terminal via the network. Otherwise, the communication device 416 transmits a printability message, indicating that the office information system is not in a printable state, to the remote terminal via the network. This enables the user on the remote terminal to easily receive the printability message of the office information system. The office information system of the present embodiment makes it possible to provide the user on the remote terminal with the printability message of the system when a sheet-quality-specified message request from the remote terminal is received.

Figure 27:
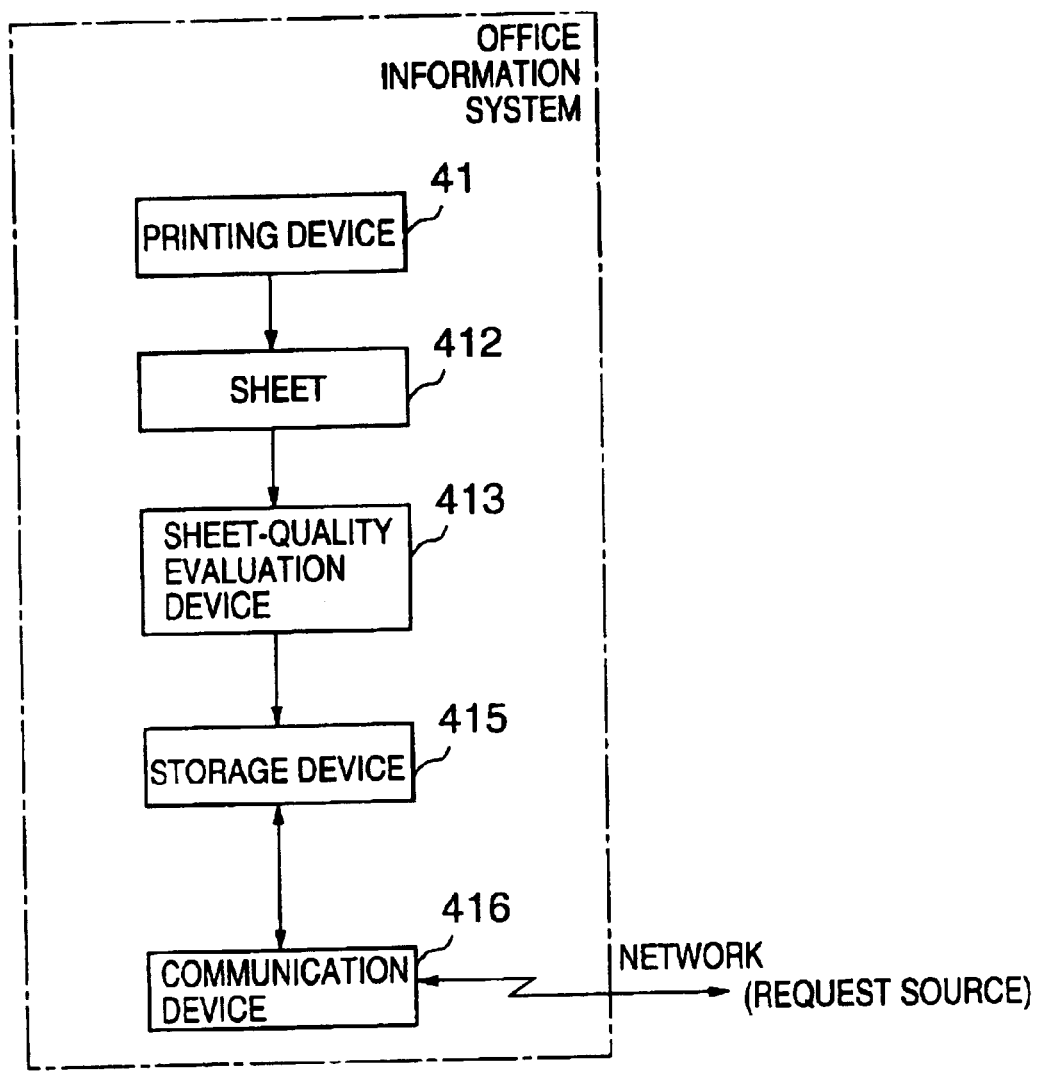
FIG. 27 is a block diagram of another variation of the office information system of the present embodiment.

FIG. 27 is a block diagram of another variation of the office information system of the present embodiment. In FIG. 27, the elements which are essentially the same as corresponding elements in FIG. 26 are designated by the same reference numerals.

The office information system of FIG. 27 includes a printing device 41 which produces a printed image on a copy sheet 412. A sheet-quality evaluation device 413 produces a result of evaluation of a quality of the copy sheet 412 every time the copy sheet is output by the printing device 41. A storage device 415 stores the result of evaluation output by the sheet-quality evaluation device 413. The storage device 415 is coupled to a communication device 416, and the communication device 416 is linked to a remote terminal (not shown) via a network for telecommunications between the system and the remote terminal.

In the office information system of FIG. 27, a latest result of the sheet-quality evaluation that is output by the sheet-quality evaluation device 413 is stored in the storage device 415, and the communication device 416 transmits a printability message, indicating whether the office information system is in a printable state, to the remote terminal via the network when a sheet-quality-specified message request from the remote terminal is received at the communication device 416.

In the office information system of the present embodiment, the latest result of the evaluation that is output by the sheet-quality evaluation device 413 is stored in the storage device 415. Specifically, when the sheet-quality-specified message request is received at the communication device 416, the communication device 416 sends a control signal to the storage device 415 so that the latest result of the sheet-quality evaluation is read from the storage device 415. When the latest evaluation quality from the storage device 415 meets the specified sheet quality of the received request, the communication device 416 transmits a printability message, indicating that the office information system is in a printable state, to the remote terminal via the network. Otherwise, the communication device 416 transmits a printability message, indicating that the office information system is not in a printable state, to the remote terminal via the network. This enables the user on the remote terminal to easily receive the printability message of the office information system. The office information system of the present embodiment makes it possible to provide the user on the remote terminal with the printability message of the system when a sheet-quality-specified message request from the remote terminal is received.

In the above embodiments of FIG. 20 through FIG. 27, the office information system is configured such that the communication device is linked to a digital network (for example, the integrated services digital network ISDN).

Alternatively, the office information system in the above embodiments of FIG. 20 through FIG. 27 may be configured such that the communication device is linked to an analog telephone network (for example, the public switched telephone network PSTN).

Figure 28:
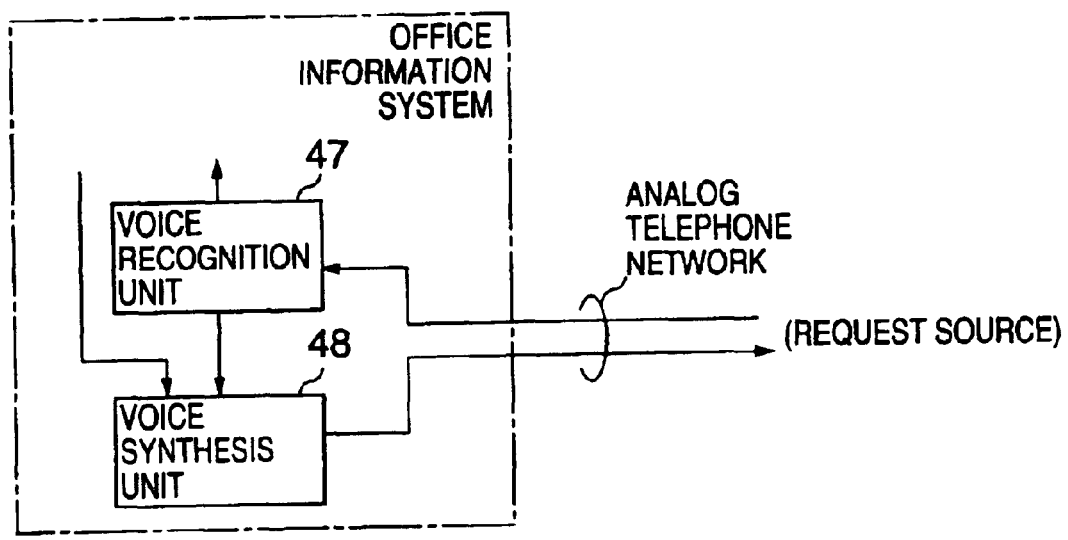
FIG. 28 is a diagram for explaining a configuration of the office information system of the present embodiment linked to an analog telephone network.

FIG. 28 is a diagram for explaining a configuration of the office information system of the present embodiment linked to an analog telephone network.

As shown in FIG. 28, the office information system of this embodiment is configured to include a voice recognition unit 47 and a voice synthesis unit 48 which are linked to a remote terminal via an analog telephone network. The voice recognition unit 47 recognizes a voice signal, which is sent from the remote terminal (or the request source) via the network, as being an operational request for the office information system. The voice synthesis unit 48 produces a synthesized voice signal, which is sent to the remote terminal via the network, based on an operational message output by the communication device.

Figure 29:
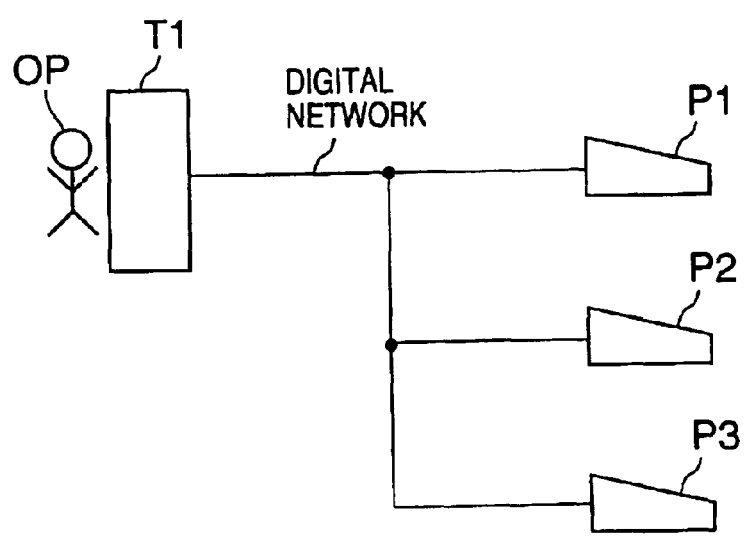
FIG. 29 is a diagram for explaining another configuration of the office information system of the present embodiment linked to a digital network.

FIG. 29 is a diagram for explaining another configuration of the office information system of the present embodiment linked to a digital network.

In the example of FIG. 29, three office information systems (or three personal computers) P1, P2 and P3 are linked to a remote personal computer T1 via a digital network. The office information system of the present embodiment makes it possible that an operator OP on the remote personal computer T1 sends an operational request from the computer T1 to any of the office information systems P1, P2 and P3 via the digital network, and receives an operational message from the requested-one of the office information systems P1, P2 and P3 via the digital network.

Figure 30:
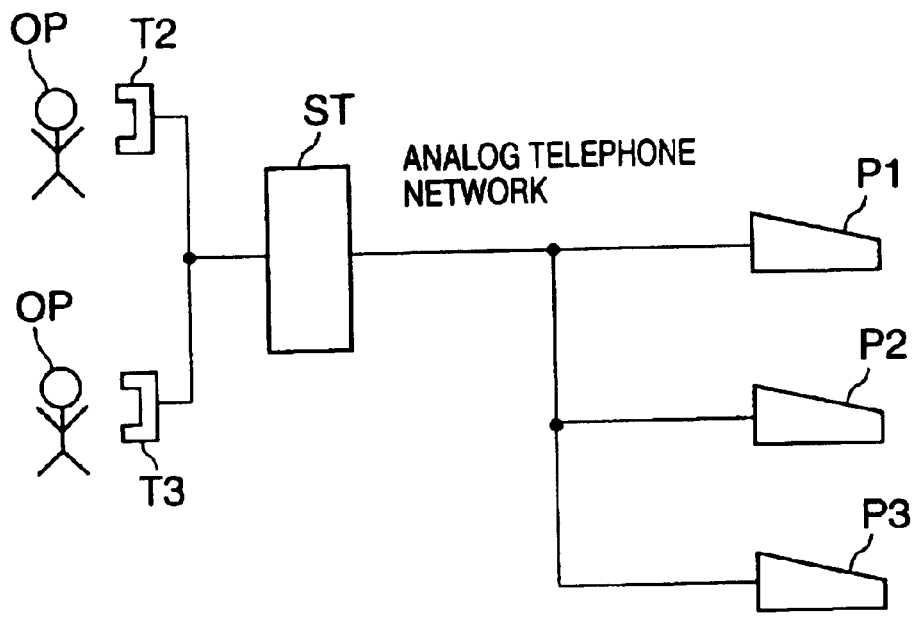
FIG. 30 is a diagram for explaining a configuration of the office information system of the present embodiment linked to an analog telephone network.

FIG. 30 is a diagram for explaining another configuration of the office information system of the present embodiment linked to an analog telephone network.

In the example of FIG. 30, three office information systems (or three personal computers) P1, P2 and P3 are linked to a center machine ST via an analog telephone network, while remote telephone sets T2 and T3 are linked to the center machine ST via the analog telephone network. The office information system of the present embodiment makes it possible that an operator OP on each of the remote telephone sets T2 and T3 sends an operational request to any of the office information systems P1, P2 and P3 via the analog telephone network, and receives an operational message from the requested one of the office information systems P1, P2 and P3 via the analog telephone network.

Figure 31:
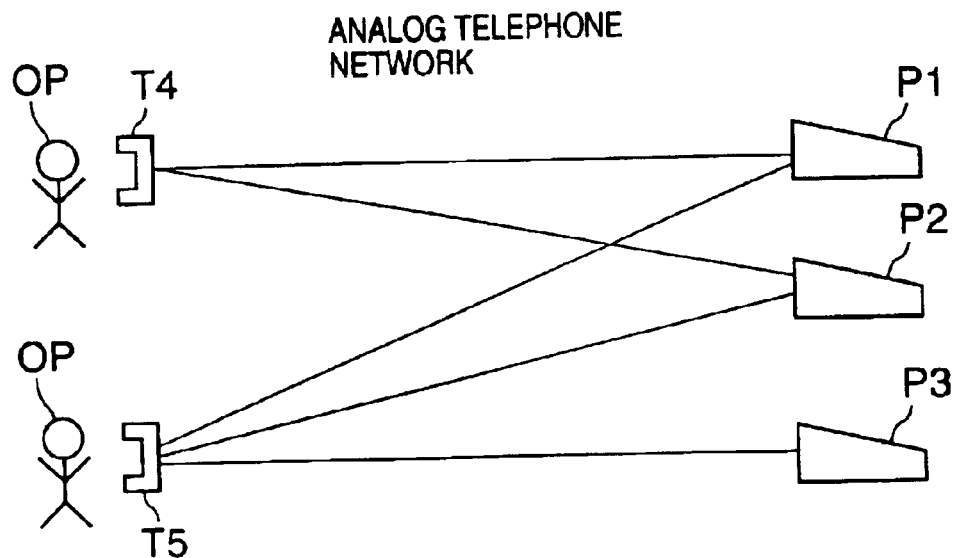
FIG. 31 is a diagram for explaining a configuration of the office information system of the present embodiment linked to an analog telephone network.

FIG. 31 is a diagram for explaining another configuration of the office information system of the present embodiment linked to an analog telephone network.

In the example of FIG. 31, three office information systems (or three personal computers) P1, P2 and P3 are linked to remote telephone sets T4 and T5 via an analog telephone network. Similarly, the office information system of the present embodiment makes it possible that an operator OP on each of the remote telephone sets T4 and T5 sends an operational request to any of the office information systems P1, P2 and P3 via the analog telephone network, and receives an operational message from the requested one of the office information systems P1, P2 and P3 via the analog telephone network.

In the examples of FIG. 30 and FIG. 31, each of the office information systems P1, P2 and P3 is provided with the voice recognition unit 47 and the voice synthesis unit 48 as in the embodiment of FIG. 28, and these elements 47 and 48 are linked to any remote terminal via the analog telephone network.

Figures 32, 33:
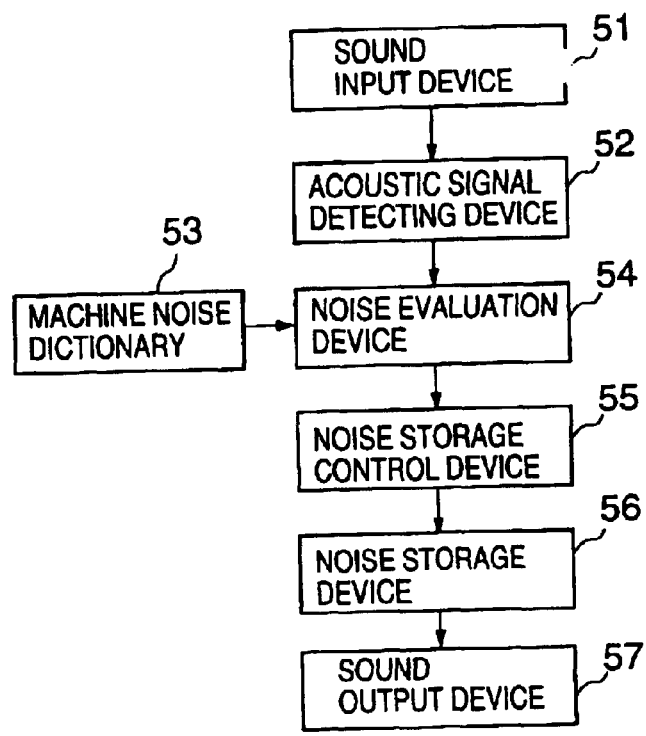
FIG. 32 is a block diagram of a fifth embodiment of the office information system according to the invention.
FIG. 33 is a diagram showing an example of a noise data stored In a noise storage device of the office information system of FIG. 32.

Next, FIG. 32 is a block diagram of a fifth embodiment of the office information system according to the invention.

As shown in FIG. 32, the office information system of the present embodiment includes a sound input device 51 which accepts an input signal. An acoustic signal detecting device 52 detects an acoustic signal from the input signal accepted by the sound input device 51. The acoustic signal detecting device 52 determines whether the detected acoustic signal is a noise signal or a speech signal. A machine noise dictionary 53 stores reference noise patterns provided for a noise evaluation. When the detected acoustic signal is determined by the acoustic signal detecting device 52 as being the noise signal, a noise evaluation device 54 determines whether or not the noise signal is acceptable based on the reference noise patterns from the machine noise dictionary 53. A noise storage device 56 stores a machine noise signal. A noise storage control device 55 allows the machine noise signal to be stored into the noise storage device 56, based on a result of the determination of the noise signal by the noise evaluation device 54. A sound output device 57 reproduces the noise signal from the noise storage device 56.

In the office information system of FIG. 32, the acoustic signal detecting device 52 is capable of detecting or extracting acoustic segments having a power larger than a given threshold level from the input signal accepted by the sound input device 51. A known method of detecting whether the acoustic signal is caused by noise or by speech, which is known in the fields of speech recognition may be used for the acoustic signal detecting device 52. For example, the detection of a noise signal from an acoustic signal may be carried out by checking the presence of a pitch in the acoustic signal or the continuous period of the acoustic signal. Alternatively, the acoustic signal detecting device 52 may be configured to determine whether or not the acoustic signal is a speech signal by using a known speech recognition technique. When the acoustic signal is rejected as a result of the speech recognition, the acoustic signal detecting device 52 may determine that the acoustic signal is a noise signal.

In the office information system of FIG. 32, the noise evaluation device 54 carries out the noise evaluation in the following manner. Suppose that reference noise patterns of "p" accepted noise signals and reference noise patterns of "q" rejected noise signals are stored in the machine noise dictionary 53. Further, suppose that N(k) (where k=1, 2, ..., l) denotes the reference noise patterns of one of the "p" accepted noise signals from the noise dictionary 53, and A(k) denotes the reference noise patterns of one of the "q" rejected noise signals from the noise dictionary 53. Suppose that the noise signal detected by the detecting device 52 has a sequence of feature patterns Xi (where i=1, 2, ..., l). "l" denotes the number of frames which the acoustic signal of concern is divided into. A suitable length of one frame is, for example, 10 msec, which is equivalent to that used in known speech recognition techniques. A suitable type of the feature vector is, for example, LPC MEL cepstram, which is widely used in known speech recognition techniques.

A similarity factor R(X, N(k)) which represents the magnitude of a difference between the feature patterns X of the noise signal of concern and the reference noise patterns N(k) of one of the "p" accepted noise signals is calculated by using the following equation:

$$R(X, N(k)) = \sum_{i=1}^{l} \{|Xi - N(k)|\} \quad (1)$$

In the noise evaluation device 54, the similarity factors R(X, N(k)) for all of the "p" accepted noise signals from the noise dictionary 53 are first calculated in the above manner. When all of the similarity factors R(X, N(k)) are smaller than a predetermined threshold value TH1, the noise evaluation device 54 determines that the noise signal of concern is probably to be rejected. In this case, the noise evaluation device 54 then calculates the similarity factors R(X, A(k)) for all of the "q" rejected noise signals from the noise dictionary 53 in a similar manner. When all of the similarity factors R(X, A(k)) are larger than a predetermined threshold value TH2, it is finally determined that the noise signal of concern is not acceptable (or it is rejected). On the other hand, when the similarity factors R(X, A(k)) are smaller than the threshold value TH2, it is determined that the noise signal of concern is either an accepted noise signal different from those stored in the noise dictionary 53 or a rejected noise signal different from those stored in the noise dictionary 53.

In the office information system of FIG. 32, when the noise evaluation is carried out at the noise evaluation device 54, the noise storage control device 55 allows the machine noise signal to be stored into the noise storage device 56, based on a result of the determination of the noise signal by the noise evaluation device 54. In the noise storage device 56, the machine noise data with respect to the noise signal of concern is stored together with the result (accepted or rejected) of the noise evaluation. The noise storage control device 55 may be configured to allow a date and time of the determination of the noise signal with respect to each noise signal to be additionally stored into the noise storage device 56. FIG. 33 shows an example of the noise data stored in the noise storage device 56 of the office information system of FIG. 32.

In the office information system of FIG. 32, the sound output device 57 is configured to reproduce the noise signal from the noise storage device 56. Once the machine noise data is stored in the noise storage device 56, the noise signal can be reproduced by the sound output device 57 from the noise storage device 56 at any time. The user may input a reproduce request from a keyboard (not shown) of the office information system, and the sound output device 57 reproduces the noise signal from the noise storage device 56 in response to the request. Further, the date and time and the result of evaluation with respect to each noise data may be displayed on a display device (not shown) of the office information system. Accordingly, the office information system of the present embodiment is effective in providing easy searching and recognition of a failure in the system by using the result of the machine noise evaluation, and in providing the user with an operational message that allows efficient failure recovery in the system.

Further, in the office information system of FIG. 32, when the noise evaluation device 54 determines that the noise signal of concern is either an accepted noise signal different from those stored in the noise dictionary 53 or a rejected noise signal different from those stored in the noise dictionary 53, it is possible to additionally register such a new noise signal into the noise dictionary 53. The addition of new reference noise patterns or the modification of the existing reference noise patterns in the noise dictionary 53 is possible by training the office information system on various noise signals.

Figure 34:
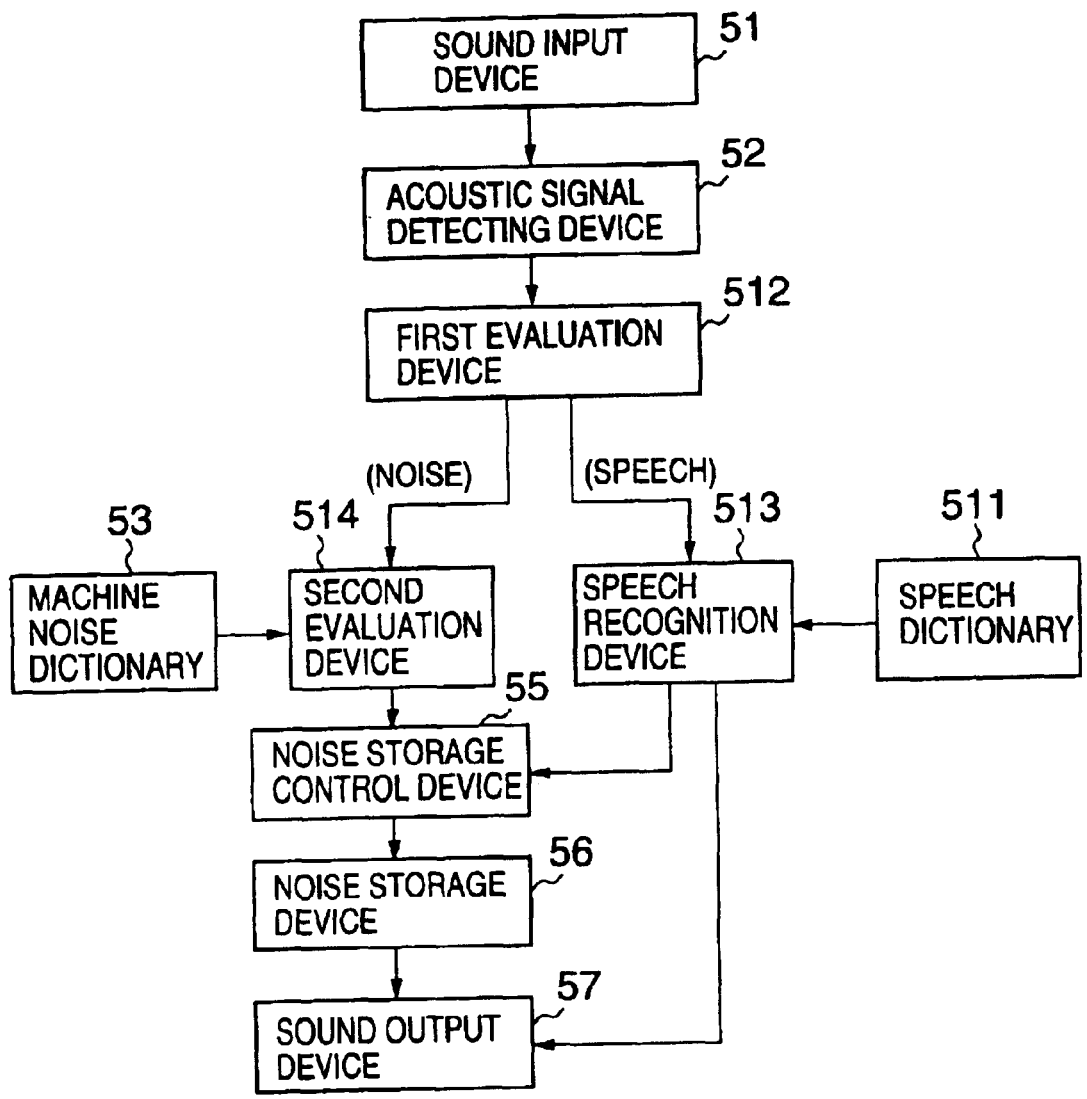
FIG. 34 is a block diagram of a variation of the office information system of the present embodiment.

FIG. 34 is a block diagram of a variation of the office information system of the present embodiment. In FIG. 34, the elements which are essentially the same as corresponding elements in FIG. 32 are designated by the same reference numerals.

The office information system of the present embodiment includes, as shown in FIG. 34, a sound input device 51 which accepts an input signal. An acoustic signal detecting device 52 detects an acoustic signal from the input signal accepted by the sound input device 51. A first evaluation device 512 determines whether the detected acoustic signal is a noise signal or a speech signal. A speech dictionary 511 stores reference feature patterns provided for a speech recognition. A machine noise dictionary 53 stores reference noise patterns provided for a noise evaluation. A speech recognition device 513 recognizes, when the detected acoustic signal is determined as being the speech signal, the speech signal as being an operational request based on the reference feature patterns from the speech dictionary 511. A second evaluation device 514 determines whether or not the noise signal is acceptable based on the reference noise patterns from the machine noise dictionary 53, when the detected acoustic signal is determined as being the noise signal. A noise storage device 56 stores a machine noise signal. A noise storage control device 55 allows the machine noise signal to be stored into the noise storage device, based on a result of the determination of the noise signal by the second evaluation device 514. A sound output device 57 reproduces the noise signal from the noise storage device 56.

In the office information system of FIG. 34, the first evaluation device 512 carries out the detection of a noise signal from an acoustic signal by checking the presence of a pitch in the acoustic signal or the continuous period of the acoustic signal. Alternatively, the first evaluation device 512 may be configured to determine whether or not the acoustic signal is a speech signal by using a known speech recognition technique. When the acoustic signal is rejected as a result of the speech recognition, the first evaluation device 512 may determine that the acoustic signal is a noise signal.

In the office information system of FIG. 34, the second evaluation device 514 carries out the noise evaluation in the same manner as in the embodiment of FIG. 32. Suppose that reference noise patterns of "p" accepted noise signals and reference noise patterns of "q" rejected noise signals are stored in the machine noise dictionary 53. Further, suppose that N(k) (where k=1, 2, . . . , l) denotes the reference noise patterns of one of the "p" accepted noise signals from the noise dictionary 53, and A(k) denotes the reference noise patterns of one of the "q" rejected noise signals from the noise dictionary 53. Suppose that the noise signal detected by the detecting device 52 has a sequence of feature patterns Xi (where i=1, 2, . . . , l). "l" denotes the number of frames which the acoustic signal of concern is divided into. A suitable length of one frame is, for example, 10 msec, which is equivalent to that used in known speech recognition techniques. A suitable type of the feature vector is, for example, LPC MEL cepstram, which is widely used in known speech recognition techniques.

A similarity factor R(X, N(k)) which represents the magnitude of a difference between the feature patterns X of the noise signal of concern and the reference noise patterns N(k) of one of the "p" accepted noise signals is calculated by using the above equation (1). In the second evaluation device 514, the similarity factors R(X, N(k)) for all of the "p" accepted noise signals from the noise dictionary 53 are first calculated in the above manner. When all of the similarity factors R(X, N(k)) are smaller than a predetermined threshold value TH1, the second evaluation device 514 determines that the noise signal of concern is probably to be rejected. In this case, the second evaluation device 514 then calculates the similarity factors R(X, A(k)) for all of the "q" rejected noise signals from the noise dictionary 53 in a similar manner. When all of the similarity factors R(X, A(k)) are larger than a predetermined threshold value TH2, it is finally determined that the noise signal of concern is not acceptable (or it is rejected). On the other hand, when the similarity factors R(X, A(k)) are smaller than the threshold value TH2, it is determined that the noise signal of concern is either an accepted noise signal different from those stored in the noise dictionary 53 or a rejected noise signal different from those stored in the noise dictionary 53.

Figures 35, 36:
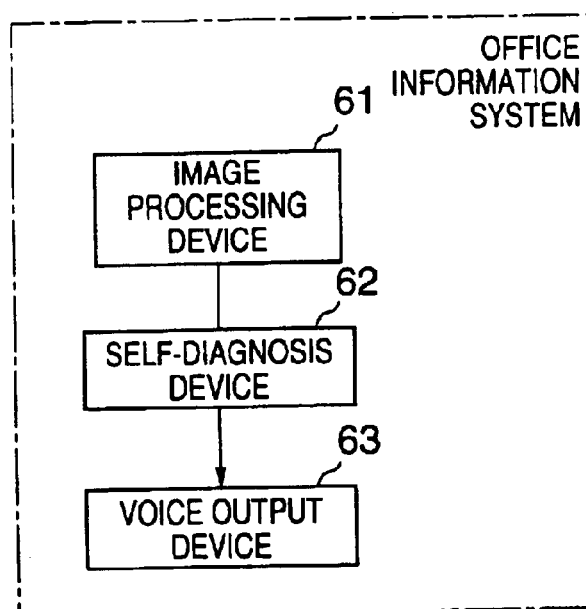
FIG. 35 is a diagram showing an example of a noise data stored in a noise storage device of the office information system of FIG. 34.
FIG. 36 is a block diagram of a sixth embodiment of the office information system according to the invention.

In the office information system of FIG. 34, when the noise evaluation is carried out at the second evaluation device 514, the noise storage control device 55 allows the machine noise signal to be stored into the noise storage device 56, based on a result of the determination of the noise signal by the second evaluation device 514. In the noise storage device 56, the machine noise data with respect to the noise signal of concern is stored together with the result (accepted or rejected) of the noise evaluation. The noise storage control device 55 may be configured to allow a date and time of the determination of the noise signal with respect to each noise signal to be additionally stored into the noise storage device 56. FIG. 35 shows an example of the noise data stored in the noise storage device 56 of the office information system of FIG. 34.

In the office information system of FIG. 34, the sound output device 57 is configured to reproduce the noise signal from the noise storage device 56. Once the machine noise data is stored in the noise storage device 56, the noise signal can be reproduced by the sound output device 57 from the noise storage device 56 at any time. The user may input a reproduce request from a keyboard (not shown) of the office information system, and the sound output device 57 reproduces the noise signal from the noise storage device 56 in response to the request. Further, the date and time and the result of evaluation with respect to each noise data may be displayed on a display device (not shown) of the office information system. Accordingly, the office information system of the present embodiment is effective in providing easy searching and recognition of a failure in the system by using the result of the machine noise evaluation, and in providing the user with an operational message that allows efficient failure recovery in the system.

As shown in FIG. 34, in the office information system of the present embodiment, the noise storage control device 55 may be configured to allow a label of the noise signal with respect to each noise signal to be additionally stored into the noise storage device 56. The speech recognition device 513 in this case is configured to recognize the speech signal as being a label registering request based on the reference feature patterns from the speech dictionary 511. For example, when the noise evaluation at the second evaluation device 514 results in the rejection of the noise signal and the speech recognition at the speech recognition device 513 results in the label registering request, the noise storage control device 55 acts to additionally store a "failure" label with respect to that noise signal into the noise storage device 56 as indicated in FIG. 35. Also, when the result of the noise evaluation at the second evaluation device 514 is uncertain and the speech recognition at the speech recognition device 513 results in the label registering request, the noise storage control device 55 acts to additionally store a "other noise" label with respect to that noise signal into the noise storage device 56 as indicated in FIG. 35.

Further, in the office information system of FIG. 34, when the noise evaluation device 54 determines that the noise signal of concern is either an accepted noise signal different from those stored in the noise dictionary 53 or a rejected noise signal different from those stored in the noise dictionary 53, it is possible to additionally register such a new noise signal into the noise dictionary 53 The addition of new reference noise patterns or the modification of the existing reference noise patterns in the noise dictionary 53 is possible by training the office information system on various noise signals.

Next, FIG. 36 is a block diagram of a sixth embodiment of the office information system according to the invention. The office information system of this embodiment is applicable to copier systems, facsimile systems or printer systems.

As shown in FIG. 36, the office information system of the present embodiment includes an image processing device 61 which prints a processed image, obtained from an original image, on a copy sheet. A self-diagnosis device 62 determines whether the printed image on the copy sheet, output from the image processing device 61, is defective in image quality. A voice output device 63 outputs a synthesized voice when the printed image is determined as being defective, the synthesized voice indicating a result of the determination by the self-diagnosis device 62.

In the office information system of FIG. 36, the image processing device 61 is configured to obtain a processed image by optically scanning an original image with a scanner and processing the image through a known image processing technique. The image processing device 61 is configured to print the processed image on the copy sheet by using toner. The self-diagnosis device 62 is configured to determine whether the printed image on the copy sheet, output from the image processing device 61, is defective in image quality.

The determination of the printed image as to the image quality is carried out by checking a level of optical density of the entire printed image. When lack of toner or a deterioration of a cleaner occurs in the office information system, the level of optical density of the entire printed image becomes considerably low. The self-diagnosis device 62 is configured to check the level of optical density of the entire printed image, and when the level of optical density is detected to be lower than a predetermined reference level, the self-diagnosis device 61 determines that the printed image is defective in image quality. Alternatively, the self-diagnosis device 62 may be configured to carry out a character recognition on the printed image in a case in which the printed image contains characters only. When the rejection rate of the printed image as a result of the character recognition is higher than a predetermined reference value, the self-diagnosis device 62 determines that the printed image is defective in image quality.

In the office information system of FIG. 36, the voice output device 63 outputs a synthesized voice when the printed image is determined as being defective, the synthesized voice indicating a result of the determination by the self-diagnosis device 62. This enables the user to easily recognize the occurrence of lack of toner or a deterioration of the cleaner in the system.

In the office information system of FIG. 36, the self-diagnosis device 62 is configured to predict the occurrence of lack of copy sheets in the system by using a paper sensor. The paper sensor monitors or detects the height of a stack of copy sheets placed in the system, and when the height detected by the paper sensor is smaller than a predetermined reference height (for example, 1 mm), the self-diagnosis device 62 determines that the lack of copy sheets will occur in the system. The voice output device 63 outputs a synthesized voice indicating the lack of copy sheets in the system, when the occurrence of the lack of copy sheets is determined by the self-diagnosis device 62. This is done before the copy sheets are completely consumed in the system. Hence, this enables the user to easily predict the occurrence of lack of copy sheets in the system.

Further, in the office information system of FIG. 36, the self-diagnosis device 62 is configured to predict the occurrence of lack of staples in the system by using a sensor. The sensor monitors or detects the length of staples placed in the system, and when the length detected by the paper sensor is smaller than a predetermined reference length (for example, a 10-piece length), the self-diagnosis device 62 determines that the lack of staples will occur in the system. The voice output device 63 outputs a synthesized voice indicating the lack of staples in the system, when the occurrence of the lack of staples is determined by the self-diagnosis device 62. This is done before the staples are completely consumed in the system. Hence, this enables the user to easily predict the occurrence of lack of staples in the system.

In the office information system of the present embodiment, the voice output device 63 outputs a synthesized voice when the printed image is determined as being defective, the synthesized voice indicating a result of the determination by the self-diagnosis device 62. The office information system of the present embodiment is effective in providing easy recognition of lack of toner or lack of copy sheets in the system by providing the user with a failure-detection voice message based on the result of the self-diagnosis of the system.

Figures 37, 38:
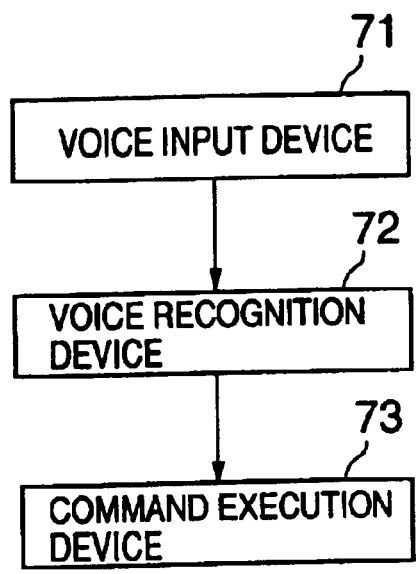
FIG. 37 is a block diagram of a seventh embodiment of the office information system according to the invention.
FIG. 38 is a diagram for explaining a relationship between voice inputs and stored increments in the office information system of FIG. 37.

Next, FIG. 37 is a block diagram of a seventh embodiment of the office information system according to the invention. The office information system of this embodiment is applicable to copier systems or facsimile systems.

As shown in FIG. 37, the office information system of the present embodiment includes a voice input device 71 which accepts an input voice from a user so as to generate an electrical signal corresponding to the input voice. A voice recognition device 72 recognizes the electrical signal, produced by the voice input device 71, as being an operational command input to the office information system. A command execution device 73 executes an image forming operation on the office information system based on the operational command recognized by the voice recognition device 72. In this system, the voice recognition device 72 is configured to recognize the electrical signal as being an operational command which sets an operating condition change to the image forming operation, the operating condition change being represented by a difference between a previously-set operating condition and a currently-set operating condition.

In the present embodiment, the voice input device 71 includes a transmitter/receiver unit (e.g., a telephone handset) which receives an input voice from the user so as to generate an electrical signal corresponding to the input voice.

In the present embodiment, the voice recognition device 72 is configured so as to provide an increased operability in the setting of operating conditions and operating condition changes to the image forming operation being executed on the office information system. For example, the voice recognition device 72 is configured to recognize an electrical signal corresponding to an input voice (for example, a spoken word "wait" or "cancel") as being an operational command input to the office information system. When the above signal is recognized by the voice recognition device 72, the voice recognition device 72 supplies a stop command or cancel command as a result of the voice recognition, to the command execution device 73. The command execution device 73 executes an image forming operation on the office information system based on the operational command recognized by the voice recognition device 72.

Alternatively, the voice recognition device 72 is configured to recognize a plurality of voice segments included in the input voice from the user, as being respective operating conditions of an operational command. Suppose that the office information system is applied to a copier system and the user intends to set a plurality of operating conditions to an image forming operation to be executed on the copier system. For example, when a sequence of spoken words "A4", "double sided", "10 copies", "sort" and "staple" is inputted by the user via the voice input device 71, the voice recognition device 72 recognizes at a time the corresponding voice segments, included in the input voice from the user, as being the respective operating conditions of the copying operation. In this case, the command execution device 73 executes the copying operation on the office information system based on the operating conditions recognized by the voice recognition device 72. It is not necessary for the user to perform the keyboard (or another input device) operations in order to set the operating conditions. Hence, it is possible for the office information system of the present embodiment to ensure easy operating-condition setting procedures for the user.

As described above, the voice recognition device 72 is configured to recognize the electrical signal as being an operational command which sets an operating condition change to the image forming operation, the operating condition change being represented by a difference between a previously-set operating condition and a currently-set operating condition.

FIG. 38 shows a relationship between voice inputs and stored increments in the office information system of FIG. 37. As shown in FIG. 38, various operating-condition increments corresponding to predetermined voice inputs (or the spoken words) are stored in a memory of the voice recognition device 72. For example, when a spoken word "thicker" from the user is recognized, a copy density increment "2" corresponding to this word is read from the memory, and the voice recognition device 72 sets the copy density of the copying operation to a current copy density value by adding the read increment "2" to the previously-set copy density value. That is, the current copy density value for the copying operation is produced by the voice recognition device 72 by adding the stored increment to the previously-set copy density value. The copying operation is performed by the command execution device 73 based on the operating conditions (or the current copy density value) recognized by the voice recognition device 72.

Figure 39:
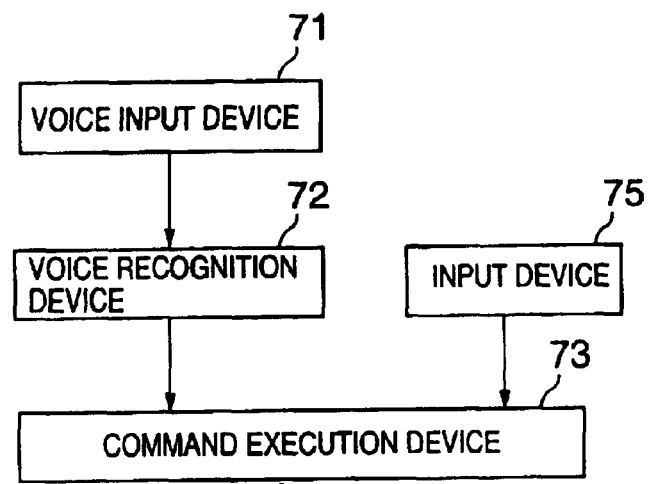
FIG. 39 is a block diagram of a variation of the office information system of the present embodiment.

FIG. 39 is a block diagram of a variation of the office information system of the present embodiment. In FIG. 39, the elements which are essentially the same as corresponding elements in FIG. 38 are designated by the same reference numerals, and a description thereof will be omitted.

As shown in FIG. 39, the office information system of the present embodiment includes an operating-condition input device 75 in addition to the elements shown in FIG. 37. The operating-condition input device 75 is, for example, a touch panel. The operating-condition input device 75 accepts a manually-indicated magnitude on the operating-condition input device 75 as an operating condition change to the image forming operation. The command execution device 73 in this embodiment executes an image forming operation on the office information system based on a combination of the operational command recognized by the voice recognition device 72 and the operating condition change accepted by the operating-condition input device 75.

Figure 40:
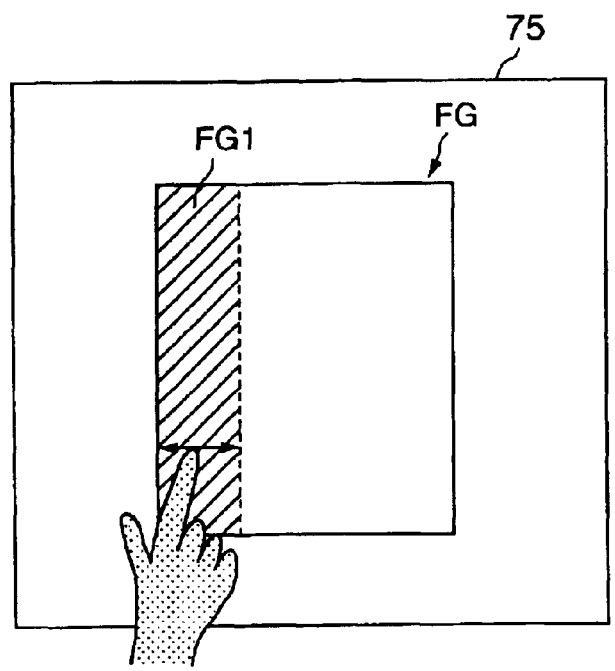
FIG. 40 is a diagram for explaining an operation of an operating-condition input device in the office information system of FIG. 39.

FIG. 40 is a diagram for explaining an operation of the operating-condition input device 75 in the office information system of FIG. 39.

As shown in FIG. 40, the operating-condition input device 75 is, for example, a touch panel. Suppose that an original image contains a photographic image in a photographic region "FG" of the original image, and the photographic region "FG" is displayed on the touch panel 75. The user inputs a photographic region change "FG1" to the office information system by using the touch panel 75, and, at the same time, inputs spoken words "leave blank in this area" via the voice input device 71. The voice recognition device 72 recognizes the input voice as being an operational command which sets the photographic region change to the image forming operation. The operating-condition input device 75 accepts the manually-indicated region change "FG1" on the operating-condition input device 75 as the operating condition change to the image forming operation.

Hence, the office information system of the present embodiment is effective in providing an increased operability in the setting of the operating conditions and the operating condition changes to the image forming operation being executed on the office information system. It is possible for the office information system of the present embodiment to ensure easy operating-condition setting procedures for the user.

Figure 41:
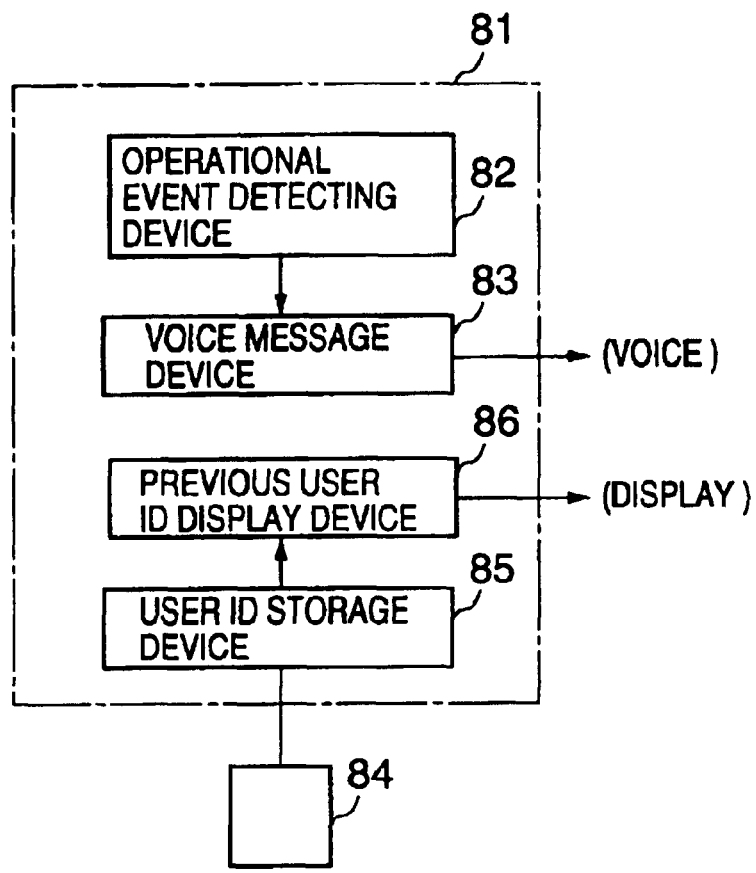
FIG. 41 is a block diagram of an eighth embodiment of the office information system according to the invention.

Next, FIG. 41 is a block diagram of an eighth embodiment of the office information system according to the invention. The office information system of this embodiment is applicable to copier systems or facsimile systems.

As shown in FIG. 41, the office information system 81 of the present embodiment includes an operational event detecting device 82 which determines whether an operational error occurs in the system by detecting a plurality of predetermined operational events in the system. A voice message device 83 outputs a voice message based on a result of the detection of the plurality of predetermined operational events, the voice message being indicative of the occurrence of an operational error in the system.

Specifically, the office information system of the present embodiment is applied to a copier system. In the present embodiment, the operational event detecting device 82 detects whether a user leaves from the system, whether a new user attends at the system in place of the user, and whether a document remains on the system after the leaving of the user or the attendance of the new user. The voice message, output by the voice message device 83 when the document is detected as remaining on the system, indicates that the document remains on the system after the leaving of the user or the attendance of the new user. This enables the user to easily recognize that an operational error (or the document being left on the system) occurs in the system.

Further, the office information system of the present embodiment is applied to a copier system. Specifically, in the present embodiment, the operational event detecting device 82 detects whether a user leaves from the system, whether a new user attends at the system in place of the user, and whether a copy sheet erroneously remains on the system (for example, it is left in an ejection tray or in a sorter unit of the copier system) after the leaving of the user or the attendance of the new user. The voice message, output by the voice message device 83 when the copy sheet is detected as erroneously remaining on the system, indicates that the copy sheet erroneously remains on the system after the leaving of the user or the attendance of the new user. This enables the user to easily recognize that an operational error (or the copy sheet being left on the system) occurs in the system.

Further, in the present embodiment, the operational event detecting device 82 is configured to detect whether a reconstructed image output by the system from an original image is defective in image quality. The voice message, output by the voice message device 83 when the reconstructed image is detected as being defective, indicates that the reconstructed image is defective. This enables the user to easily recognize that an operational error (or a reconstructed image with a defective quality being formed by the system) occurs in the system.

Further, in the present embodiment, the operational event detecting device 82 is configured to detect whether an image of a document placed on the system is a front-side image or a back-side image. The voice message, output by the voice message device 83 when the image of the document is detected as being the back-side image, indicates that the image of the document is the back-side image. This enables the user to easily recognize that an operational error (or the document being erroneously placed on the system to expose the back-side image of the document) occurs in the system.

Further, in the present embodiment, the operational event detecting device 82 is configured to detect whether a direction of an image of a document placed on the system is equal to a direction of an image to be used in a double-sided copying mode. The voice message, output by the voice message device 83 when the direction of the image of the document is detected as being unequal to that used in the double-sided copying mode, indicates that the direction of the image of the document does not match with that used in the double-sided copying mode. This enables the user to easily recognize that an operational error (or the direction of the image of the document being unsuitable to the double-sided copying mode) occurs in the system.

Further, as shown in FIG. 41, the office information system 81 of the present embodiment further includes a user ID recording medium 84 in which an identification ID of a user is stored, a user ID storage device 85 which stores the user ID read from the user ID recording medium when the recording medium is inserted into the system, and a previous user ID display device 86 which displays an image of the stored user ID output from the user ID storage device 85 when another user attends at the system in place of the user and a different user ID recording medium storing an identification of the new user is inserted into the system.

In the above-described office information system 81, the user ID recording medium 84 is, for example, an IC card, and in the IC card the identification ID of the user is stored. An image of the stored user ID output from the user ID storage device 85 is displayed by the previous user ID display device 86. When another user attends at the system in place of the user and a different IC card, storing an identification of the different user, is inserted into the system, the different user can easily recognize who is the previous-user of the system, by viewing the image of the stored user ID displayed. The office information system 81 of the present embodiment is effective in providing improved man-machine interface which allows the user to easily recognize the operational error in the system.

Figure 42:
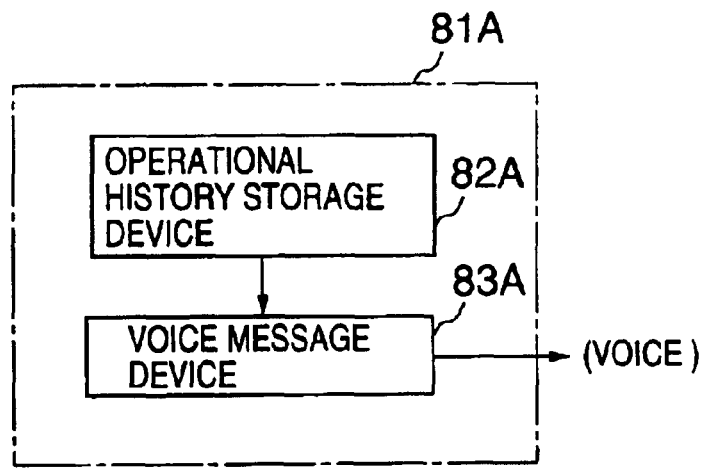
FIG. 42 is a block diagram of a variation of the office information system of the present embodiment.

FIG. 42 is a block diagram of a variation of the office information system of the present embodiment. The office information system of this embodiment is applicable to facsimile systems.

As shown in FIG. 42, the office information system 81A of the present embodiment includes an operational history storage device 82A which stores operational history records and/or document-related records which are related to the system 81A. A voice message device 83A outputs a voice message based on the operational history records and/or the document-related records read from the operational history storage device 82A, the voice message being indicative of a probability of an operational error in the system.

Specifically, in the office information system 81A of the present embodiment, previous destination facsimile numbers are stored in the operational history storage device 82A when the facsimile transmission for each destination facsimile number is successfully performed. When a destination facsimile number which does not match with any of the previous destination facsimile numbers stored in the storage device 82A is input to the office information system 81A, the voice message device 83A outputs a voice message indicating that the newly-input destination facsimile number does not match with any of the previous destination facsimile numbers and it is input to the system 81A for the first time. This allows the user to easily recognize the probability of an operational error (for example, a mistake of the input facsimile number) in the system.

Figure 43:
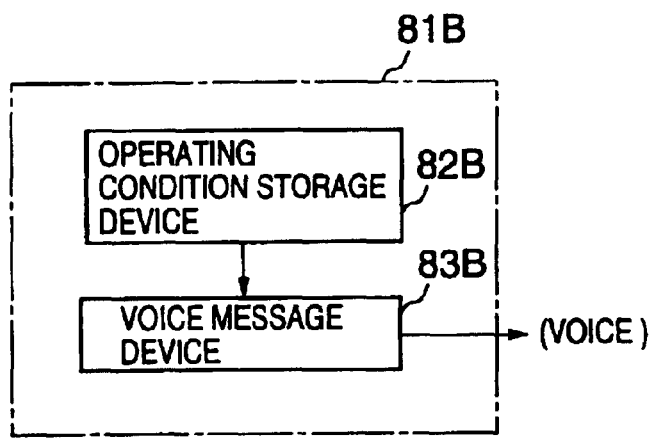
FIG. 43 is a block diagram of another variation of the office information system of the present embodiment.

FIG. 43 is a block diagram of another variation of the office information system of the present embodiment. The office information system of this embodiment is applicable to copier systems, facsimile systems or printer systems.

As shown in FIG. 43, the office information system 81B of the present embodiment includes an operating condition storage device 82B which stores operating conditions (for example, paper size, total copy number, enlargement/reduction, and single-/double-sided copying mode) related to the system 81B. A voice message device 83B outputs, prior to a start of an image forming operation of the office information system 81B, a voice message based on the operating conditions read from the operating condition storage device 82B, the voice message being indicative of the operating conditions of the system 81B.

The office information system 81B of the present embodiment is effective in providing improved man-machine interface which allows the user to easily recognize the operating conditions of the system before the start of the image forming operation of the system.

Figure 44:
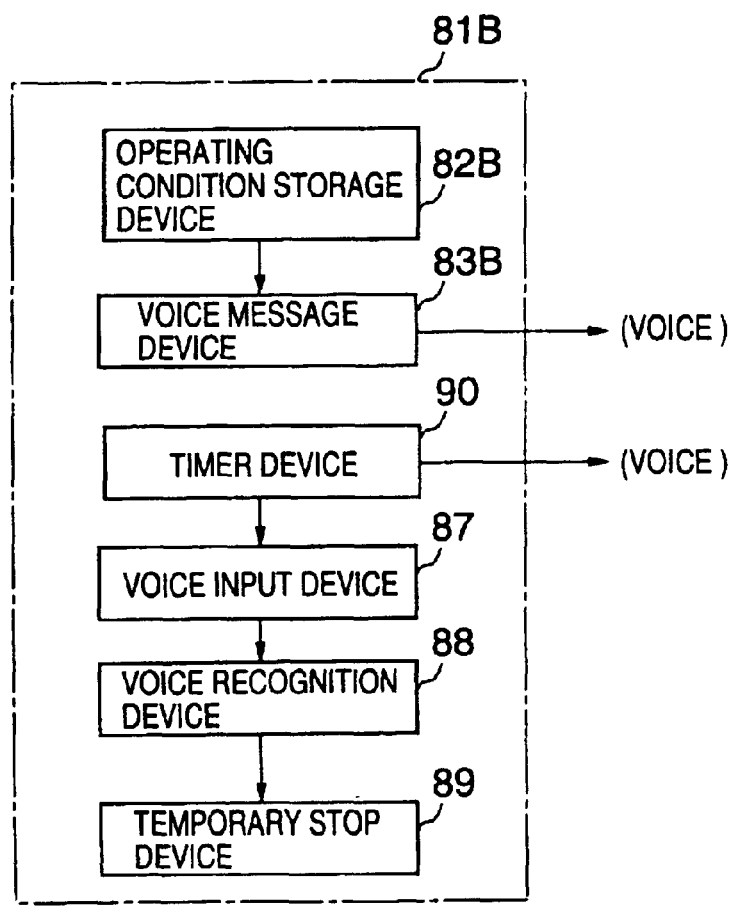
FIG. 44 is a block diagram of another variation of the office information system of the present embodiment.

FIG. 44 is a block diagram of another variation of the office information system of the present embodiment. In FIG. 44, the elements which are essentially the same as corresponding elements in FIG. 43 are designated by the same reference numerals, and a description thereof will be omitted. The office information system of this embodiment is applicable to copier systems, facsimile systems or printer systems.

As shown in FIG. 44, the office information system 81B of the present embodiment includes, in addition to the elements 82B and 83B, a voice input device 87, a voice recognition device 88, a temporary stop device 89, and a timer device 90. In the present embodiment, the voice input device 87 accepts an input voice from the user so as to generate an electrical signal corresponding to the input voice. The voice recognition device 88 recognizes the electrical signal, produced by the voice input device 87, as being an operational command input to the office information system 81B. The temporary stop device 89 temporarily stops an image forming operation on the office information system 81B when the voice recognition device 88 recognizes the electrical signal as being a predetermined stop command.

When a voice message based on the operating conditions read from the operating condition storage device 82B is outputted by the voice message device 83B, the user who has heard the voice message sometimes notices the necessity of a temporary stop of the image forming operation of the system 81B. In such a case, the user inputs a spoken word, such as "stop", "cancel" or the like, to the voice input device 87. The voice recognition device 88 recognizes the electrical signal, produced by the voice input device 87, as being the predetermined stop command input to the office information system 81B. The temporary stop device 89 temporarily stops the image forming operation on the office information system 81B. This makes it possible for the user to have an adequate period of time before actually pressing the stop button of the system.

In the present embodiment, it is not necessary that the voice recognition device 88 carries out an exact voice recognition. It is sufficient that the voice recognition device 88 roughly recognizes the electrical signal, produced by the voice input device 87, as being the predetermined stop command. For example, when a roughly estimated probability of the input voice to the stop command is larger than a given threshold level, the voice recognition device 88 may recognize the input voice as being the stop command.

Further, in the office information system 81B of the present embodiment, the timer device 90 is coupled to the voice input device 87 and enables the voice input device 87 to accept a voice input from the user only for a given period of time after the voice message is outputted by the voice message device 83B. The office information system of the present invention is effective in providing improved man-machine interface which allows the user to easily recognize the operational error in the system.

The present invention is not limited to the above-described embodiments, and variations and modifications may be made without departing from the scope of the present invention.

What is claimed is:

1. An office information system comprising:
a communication device linked to a remote terminal via a network for telecommunications between the system and the remote terminal;
an information processing device which produces a reconstructed image when an image transmitted by the remote terminal is received by the communication device via the network;
an output-data processing device which determines whether the reconstructed image output from the information processing device is defective in image quality; and
a message device which supplies, when the reconstructed image is determined as being defective, an error message, indicating that an error occurs in the outputting of the image received at the system, to the communication device, so that the error message is transmitted to the remote terminal via the network.

2. An office information system comprising:
a communication device linked to a remote terminal via a network for telecommunications between the system and the remote terminal;
a printing device which produces a printed image;
an image-quality evaluation device which produces a result of evaluation of a quality of the printed image every time the printed image is output by the printing device; and
a storage device, coupled to the communication device, which stores the result of evaluation output by the image-quality evaluation device, wherein a latest result of the evaluation that is output by the image-quality evaluation device is stored in the storage device, and said communication device transmits an operational message, indicating the stored latest result of the evaluation, to the remote terminal via the network when an image-quality message request from the remote terminal is received at the communication device.

3. The office information system according to claim 2, wherein the communication device is linked to a digital network.

4. The office information system according to claim 2, wherein the communication device is linked to an analog telephone network, and said office information system further comprises:
a voice recognition unit which recognizes a voice signal, sent from the remote terminal via the network, as the image-quality message request; and
a voice synthesis unit which produces a synthesized voice signal indicating the latest result of the evaluation output from the storage device.

5. An office information system comprising:
a communication device linked to a remote terminal via a network for telecommunications between the system and the remote terminal;
a printing device which prints an image on a copy sheet;
a sheet-quality evaluation device which produces a result of evaluation of a quality of the copy sheet every time the printed image is output by the printing device; and
a storage device, coupled to the communication device, which stores the result of evaluation output by the sheet-quality evaluation device, wherein a latest result of the evaluation that is output by the sheet-quality evaluation device is stored in the storage device, and said communication device transmits an operational message, indicating the stored latest result of the evaluation, to the remote terminal via the network when a sheet-quality message request from the remote terminal is received at the communication device.

6. The office information system according to claim 5, wherein the communication device is linked to a digital network.

7. The office information system according to claim 5, wherein the communication device is linked to an analog telephone network, and said office information system further comprises:
a voice recognition device which recognizes a voice signal, sent from the remote terminal via the network, as being the sheet-quality message request; and a voice synthesis device which produces a synthesized voice signal indicating the latest result of the evaluation output from the storage device.

8. An office information system comprising:
an image processing device which prints a processed image, obtained from an original image, on a copy sheet;
a self-diagnosis device which determines whether the printed image on the copy sheet, output from the image processing device, is defective in image quality; and
a voice output device which outputs a synthesized voice when the printed image is determined as being defective, the synthesized voice indicating a result of the determination by the self-diagnosis device.

9. The office information system according to claim 8, wherein the self-diagnosis device detects whether lack of toner or lack of copy sheets in the image processing device has occurred.

10. An office information system comprising:
a voice input device which accepts an input voice from a user so as to generate an electrical signal corresponding to the input voice;
a voice recognition device which recognizes the electrical signal, produced by the voice input device, as being an operational command input to the office information system; and
a command execution device which executes an image forming operation on the office information system based on the operational command recognized by the voice recognition device, wherein the voice recognition device is configured to recognize the electrical signal as being an operational command which sets an operating condition change to the image forming operation, the operating condition change being represented by a difference between a previously-set operating condition and a currently-set operating condition.

11. The office information system according to claim 10, wherein the voice input device includes a transmitter/receiver unit which receives an input voice from the user so as to generate an electrical signal corresponding to the input voice.

12. The office information system according to claim 10, wherein the voice recognition device is configured to recognize a plurality of voice segments included in the input voice, as being respective operating conditions of an operational command.

13. The office information system according to claim 10, further comprising an operating-condition input device which accepts a manually-indicated magnitude on the operating-condition input device as an operating condition change to the image forming operation.

14. An office information system comprising:
a user identifying device configured to authenticate a personal identification by receiving a user ID;
an operational history storage device configured to store operational history records for the system corresponding to each of the user ID; and
a customizing device configured to generate a customized operational message of the system in accordance with the stored operational history records corresponding to the user ID authenticated by said user identifying device.

* * * * *